US010846321B2

United States Patent
Xu et al.

(10) Patent No.: US 10,846,321 B2
(45) Date of Patent: Nov. 24, 2020

(54) SYSTEM AND METHOD FOR LARGE SCALE MULTIDIMENSIONAL SPATIO-TEMPORAL DATA ANALYSIS

(71) Applicant: Robert Bosch GmbH, Stuttgart (DE)

(72) Inventors: Panpan Xu, Sunnyvale, CA (US); Liu Ren, Cupertino, CA (US); Dongyu Liu, Fuzhou (CN)

(73) Assignee: Robert Bosch GmbH, Stuttgart (DE)

( * ) Notice: Subject to any disclaimer, the term of this patent is extended or adjusted under 35 U.S.C. 154(b) by 181 days.

(21) Appl. No.: 16/116,697

(22) Filed: Aug. 29, 2018

(65) Prior Publication Data
US 2019/0370346 A1 Dec. 5, 2019

Related U.S. Application Data

(60) Provisional application No. 62/678,393, filed on May 31, 2018.

(51) Int. Cl.
*G06F 16/44* (2019.01)
*G06F 16/22* (2019.01)

(52) U.S. Cl.
CPC ........ *G06F 16/444* (2019.01); *G06F 16/2237* (2019.01); *G06F 16/2264* (2019.01); *G06F 16/447* (2019.01)

(58) Field of Classification Search
CPC .. G06F 16/444; G06F 16/2237; G06F 16/447; G06F 16/2264
See application file for complete search history.

(56) References Cited

U.S. PATENT DOCUMENTS

| 8,458,109 B2 | 6/2013 | Zhang et al. |
| 8,854,489 B2 | 10/2014 | Jang et al. |
| 8,862,662 B2 | 10/2014 | Kao et al. |

(Continued)

FOREIGN PATENT DOCUMENTS

WO  2017111832 A1  6/2017

OTHER PUBLICATIONS

Chen et al., "Spatial-temporal traffic speed patterns discovery and incomplete data recovery via SVD-combined tensor decomposition," Transportation Research Part C: Emerging Technologies, vol. 86, Jan. 2018, pp. 59-77. Available online Nov. 10, 2017. (Year: 2018).*

(Continued)

*Primary Examiner* — Jay A Morrison
(74) *Attorney, Agent, or Firm* — Maginot, Moore & Beck LLP

(57) ABSTRACT

A method for extracting a pattern from spatio-temporal (ST) data includes receiving ST data, storing the ST data as s multi-dimensional array in a memory, and extracting at least one pattern from the ST data. The extracting includes generating a model approximating at least a portion of the array, and generating a visualization of a loading vector of the approximation. The ST data includes records with multiple categories of information, one of which is spatial, and one of which is temporal. Each dimension corresponds to a respective one of the categories of information. Generating the model includes applying tensor decomposition to the array, and extracting the at least one loading vector of the approximation. The extracted loading vector is indicative of a pattern in the ST data.

16 Claims, 11 Drawing Sheets

(56) References Cited

U.S. PATENT DOCUMENTS

| | | | |
|---|---|---|---|
| 2009/0022472 A1 | 1/2009 | Bronstein et al. | |
| 2011/0055379 A1* | 3/2011 | Lin | G06K 9/00677 709/224 |
| 2014/0188780 A1 | 7/2014 | Guo et al. | |
| 2016/0371563 A1 | 12/2016 | Vidal et al. | |

OTHER PUBLICATIONS

Henretty et al., "A quantitative and qualitative analysis of tensor decompositions on spatiotemporal data," 2017 IEEE High Performance Extreme Computing Conference (HPEC), IEEE, 2017. (Year: 2017).*

Andrienko, G. et al., "Space-in-Time and Time-in-Space Self-Organizing Maps for Exploring Spatiotemporal Patterns," Computer Graphics Forum, vol. 29, pp. 913-922, 2010 (10 pages).

Van Wijk, J. J. et al., "Cluster and Calendar based Visualization of Time Series Data," IEEE Symposium on Information Visualization (INFOVIS' 99), 1999 (6 pages).

Rabanser, S. et al., "Introduction to Tensor Decompositions and their Applications in Machine Learning," arXiv:1711.10781, accessed and retrieved Jul. 30, 2018 from https://arxiv.org/abs/1711.10781, 2017 (13 pages).

Kolecki, J. C., "An Introduction to Tensors for Students of Physics and Engineering", NASA/TM—2002-211716, 2002 (29 pages).

Shen, Yanning et al., "Tensor Decompositions for Identifying Directed Graph Topologies and Tracking Dynamic Networks," IEEE Transactions on Signal Processing, 2016, accessed and retrieved Jul. 30, 2018 from https://arxiv.org/abs/1610.08189 (12 pages).

Anderson, T. W., "Estimating Linear Restrictions on Regression Coefficients for Multivariate Normal Distributions," The Annals of Mathematical Statistics, vol. 22, No. 3, pp. 327-351, 1952 (25 pages).

Andrienko, G. et al., "Space-in-Time and Time-in-Space Self-Organizing Maps for Exploring Spatiotemporal Patterns," Computer Graphics Forum, 29(3), 2010 (10 pages).

Ankerst, M. et al., "OPTICS: Ordering Points to Identify the Clustering Structure," In Proc. ACM SIGMOD'99 Int. Conf. on Management of Data, 1999 (12 pages).

Bach, B. et al., "A Review of Temporal Data Visualizations Based on Space-Time Cube Operations," Eurographics Conference on Visualization (EuroVis), 2014 (19 pages).

Bahadori, M. T. et al., "Fast Multivariate Spatio-temporal Analysis via Low Rank Tensor Learning," In Advances in Neural Information Processing Systems, 2014 (9 pages).

Beecham, R. et al., "Map LineUps: effects of spatial structure on graphical inference," IEEE Transactions on Visualization and Computer Graphics, 2017 (10 pages).

Bishop, C. M., "Pattern Recognition and Machine Learning," Springer-Verlag New York, Inc., Secaucus, NJ, USA, 2006 (758 pages).

Bonilla, E. et al., "Multi-task Gaussian Process Prediction," In Advances in Neural Information Processing Systems, 2008 (8 pages).

Boyandin, I. et al., "Flowstrates: An Approach for Visual Exploration of Temporal Origin-Destination Data," In Computer Graphics Forum, vol. 30, pp. 971-980, 2011 (10 pages).

Cao, N. et al., "Voila: Visual Anomaly Detection and Monitoring with Streaming Spatiotemporal Data," IEEE transactions on visualization and computer graphics, 2018 (11 pages).

Carroll, J. D. et al., "Analysis of Individual Differences in Multidimensionalscaling Via an N-Way Generalization of "Eckart-Young" Decomposition," Psychometrika, vol. 35, No. 3, pp. 283-319, 1970 (35 pages).

Chen, W. et al., "A Survey of Traffic Data Visualization," IEEE Transactions on Intelligent Transportation Systems, 2015 (16 pages).

Cichocki, A. et al. "Nonnegative Matrix and Tensor Factorizations: Applications to Exploratory Multi-way Data Analysis and Blind Source Separation," John Wiley & Sons, 2009 (205 pages).

Cressie, N. et al., "Classes of Nonseparable, Spatio-temporal Stationary Covariance Functions," Journal of the American Statistical Association, 1999 (7 pages).

Cressie, N. et al., "Fixed Rank Filtering for Spatio-Temporal Data," Journal of Computational and Graphical Statistics, vol. 19, No. 3, pp. 724-745 (22 pages).

Cui, Q. et al., "Measuring Data Abstraction Quality in Multiresolution Visualization," IEEE Transactions on Visualization and Computer Graphics, 2006 (8 pages).

Donoho, D. L., "High-Dimensional Data Analysis: The Curses and Blessing of of Dimensionality," AMS Math Challenges Lecture, 2000 (33 pages).

Fan, Z. et al., "CitySpectrum: A Non-negative Tensor Factorization Approach," In UbiComp, 2014 (11 pages).

Ferreira, N. et al., "Visual Exploration of Big Spatio-Temporal Urban Data: A Study of New York City Taxi Trips," IEEE Transactions on Visualization and Computer Graphics, 2013 (10 pages).

Gleicher, M. et al., "Visual Comparison for Information Visualization," Information Visualization, 2011 (29 pages).

Han, J. et al., "Data Mining: Concepts and Techniques," Elsevier, 2011 (740 pages).

Han, Y. et al., "Analysis of Large-scale Traffic Dynamics in an Urban Transportation Network using Non-negative Tensor Factorization," International Journal of Intelligent Transportation Systems Research, 2016 (13 pages).

Harshman, R. A., "Foundations of the Parafac Procedure: Models and Conditions for an "Explanatory" Multimodal Factor Analysis," UCLA Working Papers in Phonetics, 16, 1970 (84 pages).

Kamat, N. et al., "Distributed and Interactive Cube Exploration," In ICDE, IEEE, 2014 (12 pages).

Kandel, S. et al., "Profiler: Integrated Statistical Analysis and Visualization for Data Quality Assessment," In Proceedings of the International Working Conference on Advanced Visual Interfaces, 2012 (8 pages).

Kofidis, E. et al., "On the Best Rank-1 Approximation of Higher-Order Supersymmetric Tensors," in SIAM Journal on Matrix Analysis and Applications, vol. 23, No. 3, pp. 863-884, 2002 (22 pages).

Kolda, T. G. et al., "Tensor Decompositions and Applications," SIAM Review, vol. 51, No. 3, pp. 455-500, 2009 (46 pages).

Kraak, M., "The Space-Time Cube Revisited From a Geovisualization Perspective," in Proceedings of the 21st International Cartographic Conference (ICC), pp. 1988-1996, 2003 (9 pages).

Liu, D. et al., "SmartAdP: Visual Analytics of Large-scale Taxi Trajectories for Selecting Billboard Locations," IEEE transactions on visualization and computer graphics, 2017 (10 pages).

Liu, Z. et al., "imMens: Real-time Visual Querying of Big Data," In Computer Graphics Forum, vol. 32, No. 3, 2013 (10 pages).

Luan, W. et al., "Partition-based Collaborative Tensor Factorization for POI Recommendation," IEEE/CAA Journal of Automatica Sinica, vol. 4, No. 3, pp. 437-446 (10 pages).

Pahins, C. A. et al., "Hashedcubes: Simple, Low Memory, Real-Time Visual Exploration of Big Data," IEEE transactions on visualization and computer graphics, 2017 (10 pages).

Punj, G. et al., "Cluster Analysis in Marketing Research: Review and Suggestions for Application," Journal of Marketing Research, pp. 134-148, 1983 (15 pages).

Rao, R. et al., "The Table Lens: Merging Graphical and Symbolic Representations in an Interactive Focus+ Context Visualization for Tabular Information," Human Factors in Computing Systems, pp. 318-322, 1994 (5 pages).

Sacha, D. et al., "SOMFlow: Guided Exploratory Cluster Analysis with Self-Organizing Maps and Analytic Provenance," in IEEE Transactions on Visualization and Computer Graphics, 2018 (11 pages).

Scheepens, R. et al., "Visualization, Selection, and Analysis of Traffic Flows," IEEE transactions on visualization and computer graphics, 2016 (10 pages).

Skau, D. et al., "Arcs, Angles, or Areas: Individual Data Encodings in Pie and Donut Charts," In Computer Graphics Forum, vol. 35, No. 3, 2016 (10 pages).

Takeuchi, K. et al., "Structurally Regularized Non-negative Tensor Factorization for Spatio-temporal Pattern Discoveries," In Joint

(56) References Cited

OTHER PUBLICATIONS

European Conference on Machine Learning and Knowledge Discovery in Databases, 2017 (16 pages).
Von Landesberger, T. et al., "MobilityGraphs: Visual Analysis of Mass Mobility Dynamics via Spatio-Temporal Graphs and Clustering," IEEE transactions on visualization and computer graphics, 2016 (10 pages).
Wang, Y. et al., "Fast and Guaranteed Tensor Decomposition via Sketching," In Advances in Neural Information Processing Systems, 2015 (9 pages).
Yang, Y. et al., "Many-to-Many Geographically-Embedded Flow Visualisation: An Evaluation," IEEE transactions on visualization and computer graphics, 2017 (10 pages).
Zhang, T. et al., "Rank-one approximation to high order tensors," SIAM Journal on Matrix Analysis and Applications, 2001 (13 pages).
ZHao, J. et al., "Activities, ringmaps and geovisualization of large human movement fields," Information Visualization, vol. 7, pp. 198-209, 2008 (12 pages).
Zheng, Y. et al., "Urban Computing: Concepts, Methodologies, and Applications," ACM Transactions on Intelligent Systems and Technology, vol. 5, No. 3, Article 38, 2014 (55 pages).
W. Aigner, S. Miksch, H. Schumann, and C. Tominski. Visualization of time-oriented data. Springer Science & Business Media, 2011 (299 pages).
N. Andrienko, G. Andrienko, and P. Gatalsky. Exploratory spatio-temporal visualization: an analytical review. Journal of Visual Languages & Computing, 14(6):503-541, 2003 (39 pages).
G. Andrienko, N. Andrienko, P. Bak, D. Keim, and S. Wrobel. Visual analytics of movement. Springer Science & Business Media, 2013 (394 pages).
G. Andrienko, N. Andrienko, G. Fuchs, and J. Wood. Revealing patterns and trends of mass mobility through spatial and temporal abstraction of origin-destination movement data IEEE transactions on visualization and computer graphics, 23(9):2120-2136, 2017 (17 pages).
G. Andrienko, N. Andrienko, W. Chen, R. Maciejewski, and Y. Zhao. Visual analytics of mobility and transportation: State of the art and further research directions. IEEE Transactions on Intelligent Transportation Systems, 18(8):2232-2249, 2017 (19 pages).
X. Chen, Z. He, and J.Wang. Spatial-temporal traffic speed patterns discovery and incomplete data recovery via svd-combined tensor decomposition. Transportation Research Part C: Emerging Technologies, 86:59-77, 2018 (19 pages).
L. Hubert and P. Arabie. Comparing partitions. Journal of classification, 2(1):193-218, 1985 (26 pages).
E. H. Isaaks and M. R. Srivastava. Applied geostatistics. No. 551.72, ISA. 1989 (577 pages).
D. A. Keim. Designing pixel-oriented visualization techniques: Theory and applications. IEEE Transactions on visualization and computer graphics, 6(1):59-78, 2000 (20 pages).
L. Lins, J. T. Klosowski, and C. Scheidegger. Nanocubes for real-time exploration of spatiotemporal datasets. IEEE Transactions on Visualization and Computer Graphics, 19(12):2456-2465, 2013 (10 pages).
M. Mørup. Applications of tensor (multiway array) factorizations and decompositions in data mining. Wiley Interdisciplinary Reviews: Data Mining and Knowledge Discovery, 1(1):24-40, 2011 (17 pages).
T. Munzner. Visualization analysis and design. CRC press, 2014 (422 pages).
M. Trutschl, G. Grinstein, and U. Cvek. Intelligently resolving point occlusion. In Information Visualization, pp. 131-136. IEEE, 2003 (6 pages).
Y. Yan, Y. Tao, J. Xu, S. Ren, and H. Lin. Visual analytics of bike-sharing data based on tensor factorization. Journal of Visualization, pp. 1-15, 2018. (15 pages).
Y. Zheng, W. Wu, Y. Chen, H. Qu, and L. M. Ni. Visual analytics in urban computing: An overview. IEEE Transactions on Big Data, 2(3):276-296, 2016 (21 pages).

\* cited by examiner

SYSTEM AND METHOD FOR LARGE SCALE MULTIDIMENSIONAL SPATIO-TEMPORAL DATA ANALYSIS

RELATED APPLICATIONS

This application claims the benefit of priority from U.S. Provisional Application No. 62/678,393, entitled "TPFlow: Progressive Partition and Multidimensional Pattern Extraction for Large-Scale Spatio-Temporal Data Analysis," and filed on May 31, 2018, the content of which is incorporated by reference herein in its entirety.

TECHNICAL FIELD

This disclosure relates generally to the field of data analysis, and, more particularly, to systems and method for extracting patterns from and generating interactive visual depictions of large-scale spatio-temporal data.

BACKGROUND

Unless otherwise indicated herein, the materials described in this section are not prior art to the claims in this application and are not admitted to the prior art by inclusion in this section.

Data analysis in a growing number of fields has come to involve the study of events or circumstances that vary over time and across various locations. For example, in climate science, attributes like pressure and temperature measured over time and across the globe can be used to better understand and predict weather patterns. In neuroscience, neural activity measured over time at different locations in the brain can be used to help understand how the brain functions. In epidemiology, dated and location-tagged data can be used to help track the spread of disease or uncover environmental factors to public health. In transportation, location and time data for traffic load and travel history can be used to better understand traffic patterns and effects. This type of data, which includes not only descriptive information (categorical, numerical, etc.), but also time and location information associated with the descriptive information, is referred to as spatio-temporal data.

The analysis of spatio-temporal data presents challenges that are not present for classical types of relational data sets. For example, it is generally assumed that data in classical data sets arose under static conditions, and that each individual item in the data set is independent of the others. Unlike in classical data sets, information in spatio-temporal data can be taken under conditions that vary over time and space, and the items in the data set can be structurally related to each other in the context of time and space. As a result, performing analysis on spatio-temporal data commonly relies on techniques that simplify or aggregate the data in a manner that can be understood and manipulated by a user, such as interactive visualization.

Such techniques, however, are inherently limited by the complexity of data that can be coherently visualized to and understood by a user. The more simplification necessary to convey data in a meaningful way to a user, the greater the risk that the visualization does not accurately reflect the data. Further, the number of views needed to represent a data set exponentially increases with the dimensionality of the data set. These and other factors can make it difficult or impossible for a user to accurately uncover patterns and inferences from the data as the size of a data set increases. As a result, as the size and dimensionality of a data set increases, the applicability and performance of conventional visualization analysis approaches decrease.

As an example of these limitations, one conventional approach for visualizing spatio-temporal data displays aggregated information along each individual variable of interest. For instance, a traffic volume dataset could have records with the schema (day, hour, region)→traffic volume. In other words, each record records the traffic volume of a particular region during a particular hour of a particular day of the week. One possible view could aggregate all of the days together so as to show the average traffic load per hour irrespective of the day of the week. Another possible view could aggregate all of the hours for each day together to show the total traffic load in each region on each day of the week. A further possible view could aggregate all of the daily traffic loads to show the total traffic load in each region.

While these types of views may help a user understand general trends in the data, e.g. traffic on one day is generally higher than another, etc., such separate high-level aggregate views of each dimension do not visualize patterns that relate to more than one dimension. For example, traffic volume may exhibit consistent but different hourly patterns during weekdays and weekends. A view that aggregates all 7 days of the week to depict the typical traffic in each hour of the day does not visualize the difference in hourly traffic patterns from weekends to weekdays. To uncover this pattern in a conventional approach, a user would need to manually sift through different slices of the traffic data. Further, while the difference between weekdays and weekends may be known by the user and lead to an a priori comparison of weekday and weekend slices to discover a difference in traffic patterns, discovering unknown patterns without an a priori hypothesis could be extremely challenging. Moreover, while considering a variable like day of the week only includes 7 possible slices, the difficulty and complexity of sifting through all possible combinations of slices for a variable rises exponentially with the size of the variable.

Thus, an approach for the analysis of spatio-temporal data that can visualize data sets with a high degree of dimensionality without a loss in accuracy of the data would be beneficial. An approach that is usable to discover patterns in the data that relate to more than one dimension of the data without a priori hypothesis would also be beneficial.

SUMMARY

A method for extracting a pattern from spatio-temporal (ST) data includes receiving ST data with a processor. The ST data includes a plurality of records. Each record has a plurality of categories of information. One of the categories of information is a spatial category of information. Another of the categories of information is a temporal category of information. The processor stores the ST data, in a memory operatively connected to the processor, as a multi-dimensional array. Each dimension of the multi-dimensional array corresponds to a respective one of the plurality of categories of information. The method further includes extracting at least one pattern from the stored ST data. The extracting includes generating, with the processor, a model that approximates at least a portion of the multi-dimensional array. The generating of the model includes computing an approximation of the at least portion of the multi-dimensional array via tensor decomposition, and extracting at least one loading vector of the approximation of the at least portion of the multi-dimensional array. The at least one loading vector is indicative of at least one pattern in the ST data. The extracting further includes generating, with the processor and a display output device, at least one visualization of the at least one loading vector.

In some embodiments, the approximation of the at least portion of the multi-dimensional array is computed using a piecewise tensor decomposition process. The piecewise tensor decomposition process includes partitioning the at least portion of the multi-dimensional array into at least two sub-arrays, and computing an approximation of each of the at least two sub-arrays via tensor decomposition. The extracting at least one loading vector of the approximation of the at least portion of the tensor includes extracting at least one respective loading vector of the approximation of each of the at least two sub-tensors.

In some embodiments, the piecewise tensor decomposition process is a piecewise successive rank-one tensor decomposition process. The tensor decomposition process used to compute the approximation of the at least portion of the multi-dimensional array is a successive tensor rank decomposition process resulting in a plurality of rank-one tensor components that together define the approximation of the at least portion of the multi-dimensional array. The extracting at least one loading vector of the approximation of the at least portion of the tensor includes extracting at least one respective loading vector from each rank-one tensor component. The piecewise tensor decomposition process further includes, for each slice of the at least portion of the multi-dimensional array along at least one dimension, extracting an entry corresponding to the slice from of the at least one respective loading vector from each rank-one tensor component corresponding to the at least one dimension, and combining the entries together to form a feature vector for the slice. The partitioning of the at least portion of the multi-dimensional array into at least two sub-arrays includes grouping, with the processor, the feature vectors of the slices into clusters, determining, with the processor, partition locations for the at least portion of the multi-dimensional array along the at least one dimension based on the clusters, and partitioning the at least portion of the multi-dimensional array into at least two sub-arrays based on the partition locations.

In some embodiments, the computing of the approximation of at least one of the at least two sub-arrays includes partitioning the sub-array into at least two sub-sub-arrays, and computing an approximation of each of the at least two sub-sub-arrays via tensor decomposition. The extracting at least one loading vector of the approximation of the multi-dimensional array includes extracting at least one respective loading vector of the approximation of each of the at least two sub-sub-arrays.

In some embodiments, the partitioning of the at least portion of the multi-dimensional array into sub-arrays and the partitioning of the at least one sub-array into sub-sub-arrays are taken along a common dimension.

In some embodiments, the partitioning of the at least portion of the multi-dimensional array into sub-arrays and the partitioning of the at least one sub-array into sub-sub-arrays are taken along different dimensions.

In some embodiments, the generating of the at least one visualization includes determining a discrepancy between at least portions of the approximation of the at least portion of the multi-dimensional array and the at least portion of the multi-dimensional array, and encoding the determined discrepancy into the at least one visualization of the at least one loading vector.

In some embodiments, the method further includes receiving, via an input device, at least one instruction for generating a model that approximates at least a portion of the multi-dimensional array, wherein the generating of the model is performed according to the at least one received instruction.

In some embodiments, the at least one visualization includes a node chart of the ST data.

A system for extracting patterns from spatio-temporal (ST) data includes a display output device, a memory, and a processor operatively connected to the display output device and the memory. The memory is configured to store program instructions and ST data represented as a multi-dimensional array. The ST data that includes a plurality of records. Each record has a plurality of categories of information. One of the categories of information is a spatial category of information. Another of the categories of information is a temporal category of information. Each dimension of the multi-dimensional array corresponds to a respective one of the plurality of categories of information. The processor is configured to execute the program instructions to extract at least one pattern from the stored ST data. The extracting includes generating a model that approximates at least a portion of the multi-dimensional array by (i) computing an approximation of the at least portion of the multi-dimensional array via tensor decomposition, and (ii) extracting at least one loading vector of the approximation of the at least portion of the multi-dimensional array, the at least one loading vector indicative of at least one pattern in the ST data. The extracting further includes generating at least one visualization of the at least one loading vector using the display output device.

In some embodiments, the processor is further configured to approximate of the at least portion of the multi-dimensional array using a piecewise tensor decomposition process. The piecewise tensor decomposition process includes partitioning the at least portion of the multi-dimensional array into at least two sub-arrays, and computing an approximation of each of the at least two sub-arrays via tensor decomposition. The extracting at least one loading vector of the approximation of the at least portion of the multi-dimensional array includes extracting at least one respective loading vector of the approximation of each of the at least two sub-arrays.

In some embodiments, the piecewise tensor decomposition process is a piecewise successive rank-one tensor decomposition process. The tensor decomposition process used to compute the approximation of the at least portion of the multi-dimensional array is a successive tensor rank decomposition process resulting in a plurality of rank-one tensor components that together define the approximation of the at least portion of the multi-dimensional array. The extracting at least one loading vector of the approximation of the at least portion of the multi-dimensional array includes extracting at least one respective loading vector from each rank-one tensor component. The piecewise tensor decomposition process further includes, for each slice of the at least portion of the tensor along at least one dimension, extracting an entry corresponding to the slice from of the at least one respective loading vector from each rank-one tensor component corresponding to the at least one dimension, and combining the entries together to form a feature vector for the slice. The partitioning of the at least portion of the tensor into at least two sub-arrays includes grouping, with the processor, the feature vectors of the slices into clusters, determining, with the processor, partition locations for the at least portion of the multi-dimensional array along the at least one dimension based on the clusters, and partitioning the at least portion of the multi-dimensional array into at least two sub-arrays based on the partition locations.

In some embodiments, the computing of the approximation of at least one of the at least two sub-arrays includes partitioning the sub-array into at least two sub-sub-arrays, and computing an approximation of each of the at least two sub-sub-arrays via tensor decomposition. The extracting at least one loading vector of the approximation of the multi-dimensional array includes extracting at least one respective loading vector of the approximation of each of the at least two sub-sub-arrays.

In some embodiments, the partitioning of the at least portion of the multi-dimensional array into sub-arrays and the partitioning of the at least one sub-array into sub-sub-arrays are taken along a common dimension.

In some embodiments, the partitioning of the at least portion of the multi-dimensional array into sub-arrays and the partitioning of the at least one sub-array into sub-sub-arrays are taken along different dimensions.

In some embodiments, the processor is further configured to determining a discrepancy between at least portions of the approximation of the at least portion of the multi-dimensional array and the at least portion of the multi-dimensional array, and encoding the determined discrepancy into the at least one visualization of the at least one loading vector.

In some embodiments, the system further comprises an input device. The at least one visualization includes a graphical user interface (GUI) operatively integrated with the input device. The processor is further configured to receive at least one instruction via the input device using the GUI, and generate the model according to the at least one received instruction.

In some embodiments, the at least one visualization includes a node chart of the ST data.

This summary is intended only to introduce subject matter which is discussed in more detail in the detailed description, the drawings, and the claims, and is not intended to limit the scope of this disclosure in any way.

BRIEF DESCRIPTION OF THE DRAWINGS

The foregoing aspects and other features of the present disclosure are explained in the following description, taken in connection with the accompanying drawings.

DETAILED DESCRIPTION

Figure 1:
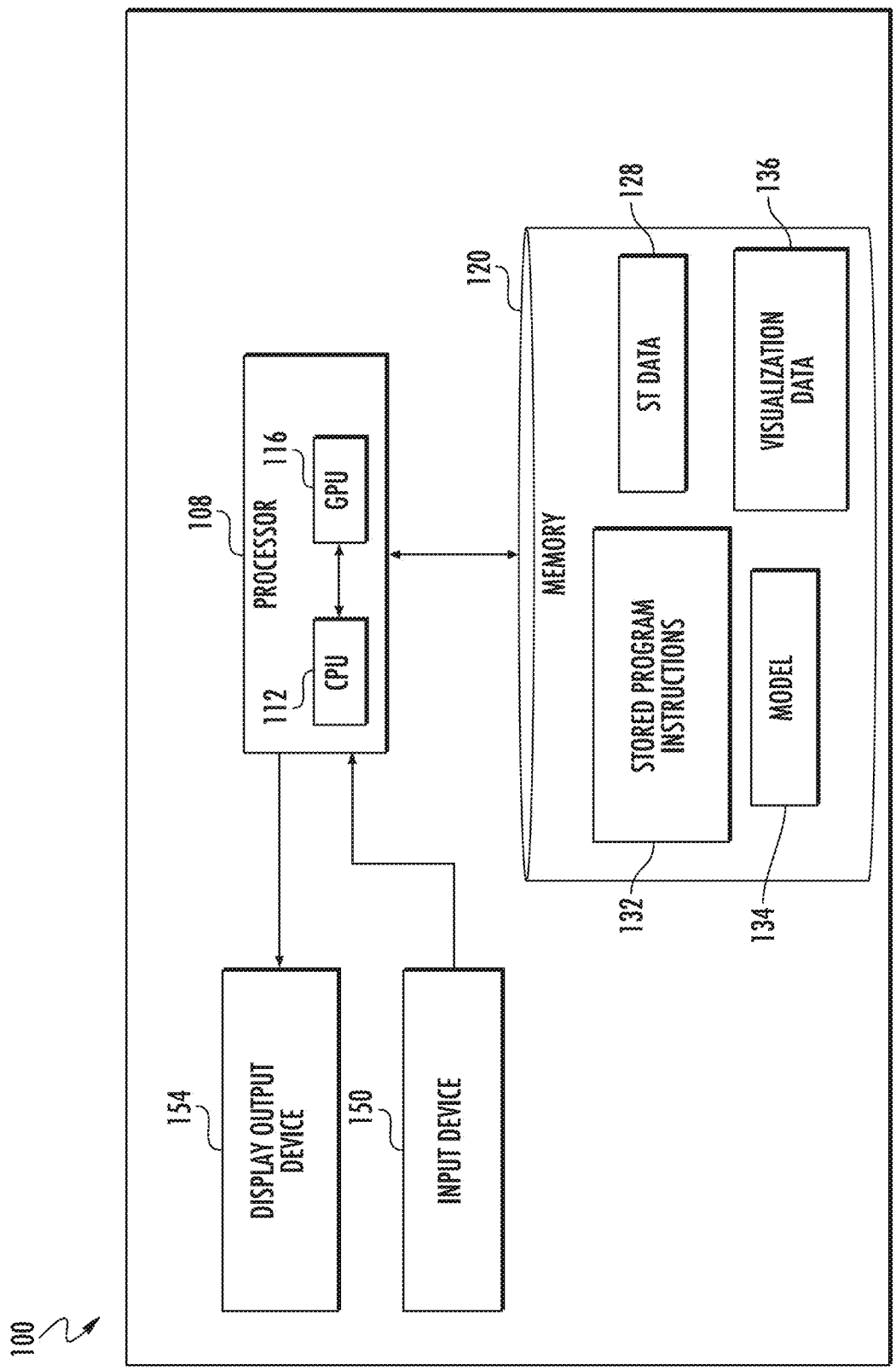
FIG. 1 is a schematic diagram of a system that extracts patterns from spatio-temporal (ST) data, and generates visualizations of the extracted patterns.

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

As used herein, the term spatio-temporal (hereinafter "ST") data means data that includes multiple records, whereby each records is associated with a time and a location. In some cases, each record corresponds to a discrete event happening at a particular location at a particular time (e.g. incidence of crime in a city). In some cases, each record corresponds to a trajectory, such that multiple entries track the motion of an object or objects over time (e.g. travel routes of vehicles). In some cases, records are measurements that correspond to information observed at a particular place at a particular time. In some cases, measurements are taken at fixed locations at various points in time (e.g. traffic load in predefined segments of a map. In some cases, measurements are taken at various points in time from locations that change over time (e.g. weather balloons taking temperature measurements as they move to approximate a continuous temperature field). ST data can be represented in a variety of formats. For example, ST data can be represented as a listing of records, such as a text file, table, data file, etc. In another example, ST data can be represented as a multi-dimensional array.

As used herein, the term "multi-dimensional array" means an arrangement of data entries whereby each entry in the array is uniquely identified by indices along each dimension of the array. For instance, a multi-dimensional array X with three dimensions I, J, and K is a multidimensional array of size I×J×K, and an individual entry in the tensor X, addressed as $X_{i,j,k}$, is indexed at i along the I dimension, at j along the J dimension, and at k along the K dimension. The value stored in the entries corresponds to a numerical category of information of interest from the records.

When used to store ST data, the dimensions of a multi-dimensional array can be used to encode information from the records. Each dimension of a multi-dimensional array for ST data can be used to encode a specific type of information associated with the entries, whereby the value for each type of information for an entry is set via the location of the entry along the dimension corresponding to that information type. Dimensions in a multi-dimensional array can represent descriptive information, such as a name, category, status, quantity, characteristic, etc. Dimensions in a multi-dimensional array can also represent spatio-temporal information such as a date, day, time, state, region, address, etc. Since indices of a dimension in an array are integers, encoding a type of information as a dimension generally includes assigning different values for that information as different indices of the dimension. For example, days of the week could be assigned indices of 1 through 7, colors of the rainbow could be assigned indices of 1-6, etc. As used herein, the terms "dimension" and "mode" are used interchangeably. The total number of dimensions in an array defines the "order" of the array.

In an example, an ST data set includes sales volume records of a company's 34 products over a 24 month period, separated by state over 16 states, so that each record follows the schema (month, product, state)→sales_volume. In other words, each record lists a sales volume for a particular product in a particular state over the course of a particular month. When this ST data is represented as a multi-dimensional array, each of the month, product, and state categories is used as a separate dimension, and the sales_volume is the value stored in the entry for each record. Each month is assigned an index (1-24), each product is assigned an index (1-34), and each state is assigned an index (1-16), resulting in a 24×34×16 array X, whereby $X_{i,j,k}$ is the sales volume in the i'th month for the j'th product in the k'th state.

In the example above, the ST data includes one dimension for location, state. ST data can include any number of dimensions for location. In one such example, an ST data set for taxi trip information includes passenger counts for each hour of each day for trips having a pickup region and a drop-off region, so that each record follows the schema (day, pickup-hour, pickup region, drop-off region)→passenger_count. In other words, each record corresponds to an individual trip, and lists the day and time the trip started, the origin and end locations, and the total number of passengers. A multi-dimensional array representing this ST data thus has two dimensions for location, pickup region, and drop-off region, and the value stored in each entry of the multi-dimensional array is the passenger_count for that entry.

In the examples above, the multi-dimensional arrays includes one dimension for time, month, and pickup-hour, respectively. Multi-dimensional arrays for ST data can include any number of dimensions for time. In one such example, an ST data set for traffic volume includes traffic loads at predetermined regions at each hour of each day so that each record follows the schema (day, hour, region)→traffic load. In other words, each record lists a traffic load in a particular region during a particular hour of a particular day. A multi-dimensional array representing this ST data thus has two dimensions for time, day, and hour.

In addition to the exemplary descriptive, spatial, and temporal dimensions in the examples above, any acceptable spatial and temporal dimensions can be used in ST data. Other acceptable dimensions for location include, for example, address, street name, neighborhood, town, county, state, country, geographical coordinates, elevation, etc. Location information can also be relational, such as proximity to a particular location, progress along a route, etc. Other acceptable dimensions for time include, for example, minutes, weeks, months, years, etc. Time dimensions can also be relational, such as time relative to a particular event, time relative to a temporally adjacent event, duration, etc. Any other acceptable descriptive dimension can be used, with reference to the type of records forming the ST data, the category or variable of interest in the ST data, or other factors.

FIG. 1 is a schematic diagram of a system 100 for analyzing ST data and for generation of a visualization of the ST data. In various embodiments, the system 100 can, for example, analyze ST data with increased efficiency and/or accuracy, and/or can generate visualizations that more effectively provide visual cues or guidance that are usable to extract latent patterns in ST data. The system 100 includes a processor 108 that is operatively connected to a memory 120, input device 150, and a display output device 154. As is described in more detail below, during operation, the system 100 (i) receives the ST data from the memory 120 or another source, (ii) analyzes the ST data, which can include, for example, generating a model 134 of the ST data that includes partitioning portions of the ST data into clusters and/or generating simplifying approximations of at least portions of the ST data, and (iii) generates an output visualization data 136 of the ST data corresponding to the model 134 that includes a visual cue or guidance indicative of a latent pattern in at least a portion of the ST data.

In the system 100, the processor 108 includes one or more integrated circuits that implement the functionality of a central processing unit (CPU) 112 and graphics processing unit (GPU) 116. In some embodiments, the processor 108 is a system on a chip (SoC) that integrates the functionality of the CPU 112 and GPU 116, and optionally other components including the memory 120, network device 152, and positioning system 148, into a single integrated device, while in other embodiments the CPU 112 and GPU 116 are connected to each other via a peripheral connection device such as PCI express or another suitable peripheral data connection. In one embodiment, the CPU 112 is a commercially available central processing device that implements an instruction set such as one of the x86, ARM, Power, or MIPS instruction set families. The GPU 116 includes hardware and software for display of at least two-dimensional (2D) and optionally three-dimensional (3D) graphics. In some embodiments, processor 108 executes software programs including drivers and other software instructions using the hardware functionality in the GPU 116 to accelerate generation and display of the graphical depictions of bipartite graph summaries and corrections that are described herein. During operation, the CPU 112 and GPU 116 execute stored programmed instructions 124 that are retrieved from the memory 120. The stored program instructions 124 include software that control the operation of the CPU 112 and the GPU 116 to generate graphical depictions of bipartite graphs based on the embodiments described herein. While FIG. 1 depicts the processor 108 including the CPU 112 and GPU 116, alternative embodiments may omit the GPU 116 since in some embodiments the processor 108 in a server generates output visualization data 136 using only a CPU 112 and transmits the output visualization data 136 to a remote client computing device that uses a GPU and a display device to display the image data. Additionally, alternative embodiments of the processor 108 can include microcontrollers, application specific integrated circuits (ASICs), field programmable gate arrays (FPGAs), digital signal processors (DSPs), or any other suitable digital logic devices in addition to or as replacements of the CPU 112 and GPU 116.

In the system 100, the memory 120 includes both non-volatile memory and volatile memory devices. The non-volatile memory includes solid-state memories, such as NAND flash memory, magnetic and optical storage media, or any other suitable data storage device that retains data when the system 100 is deactivated or loses electrical power. The volatile memory includes static and dynamic random access memory (RAM) that stores software programmed instructions 124 and data, including ST data 128 and visualization data 136, during operation of the system 100. In some embodiments the CPU 112 and the GPU 116 each have access to separate RAM devices (e.g. a variant of DDR SDRAM for the CPU 112 and a variant of GDDR, HBM, or other RAM for the GPU 116) while in other embodiments the CPU 112 and GPU 116 access a shared memory device.

The memory 120 stores each of the ST data 128, the program instructions 132, the model 134, and output visualization data 136 in any suitable format, respectively. In the memory 120, the model 134 includes partition or cluster information for the ST data set, simplifying assumptions, and/or approximations of at least portions of the ST data set. The output visualization data 136 includes one or more sets of image data that the system 100 generates to produce a graphical output of the analysis of the ST data. In some embodiments, the processor 108 generates the output image data 136 using a rasterized image format such as JPEG, PNG, GIF, or the like while in other embodiments the processor 108 generates the output image data 136 using a vector image data format such as SVG or another suitable vector graphics format. The visualization data 136 can also include user interface information usable by the system 100 to receive instructions, such as via a graphical user interface (GUI), with regard to the visualization data 136 such as, for example, ST data analysis instructions 132.

In the system 100, the input device 150 includes any devices that enable the system 100 to receive the ST data 128, ST data analysis instructions 132, and visualization data 136. Examples of suitable input devices include human interface inputs such as keyboards, mice, touchscreens, voice input devices, and the like. Additionally, in some embodiments the system 100 implements the input device 150 as a network adapter or peripheral interconnection device that receives the bipartite graph data from another computer or external data storage device, which can be useful for receiving large sets of bipartite graph data in an efficient manner.

In the system 100, the display output device 154 includes an electronic display screen, projector, printer, or any other suitable device that reproduces a graphical display of the output visualization data 136 that the system 100 generates based on the ST data 128. While FIG. 1 depicts the system 100 implemented using a single computing device that incorporates the display output device 154, other embodiments of the system 100 include multiple computing devices. For example, in another embodiment the processor 108 generates the output visualization data 136 as one or more image data files, and the processor 108 transmits the output visualization data 136 to a remote computing device via a data network. The remote computing device then displays the output visualization data 136, and in this embodiment the processor 108 is operatively connected to the display device in the remote client computing device indirectly instead of via the direct connection that is depicted in FIG. 1. In one non-limiting example, the processor 108 is implemented in a server computing device that executes the stored program instructions 124 to implement a web server that transmits the output visualization data 136 to a web browser in a remote client computing device via a data network. The client computing device implements a web browser or other suitable image display software to display the output visualization data 136 received from the server using a display output device 154 that is integrated into the client computing device.

Figure 2:
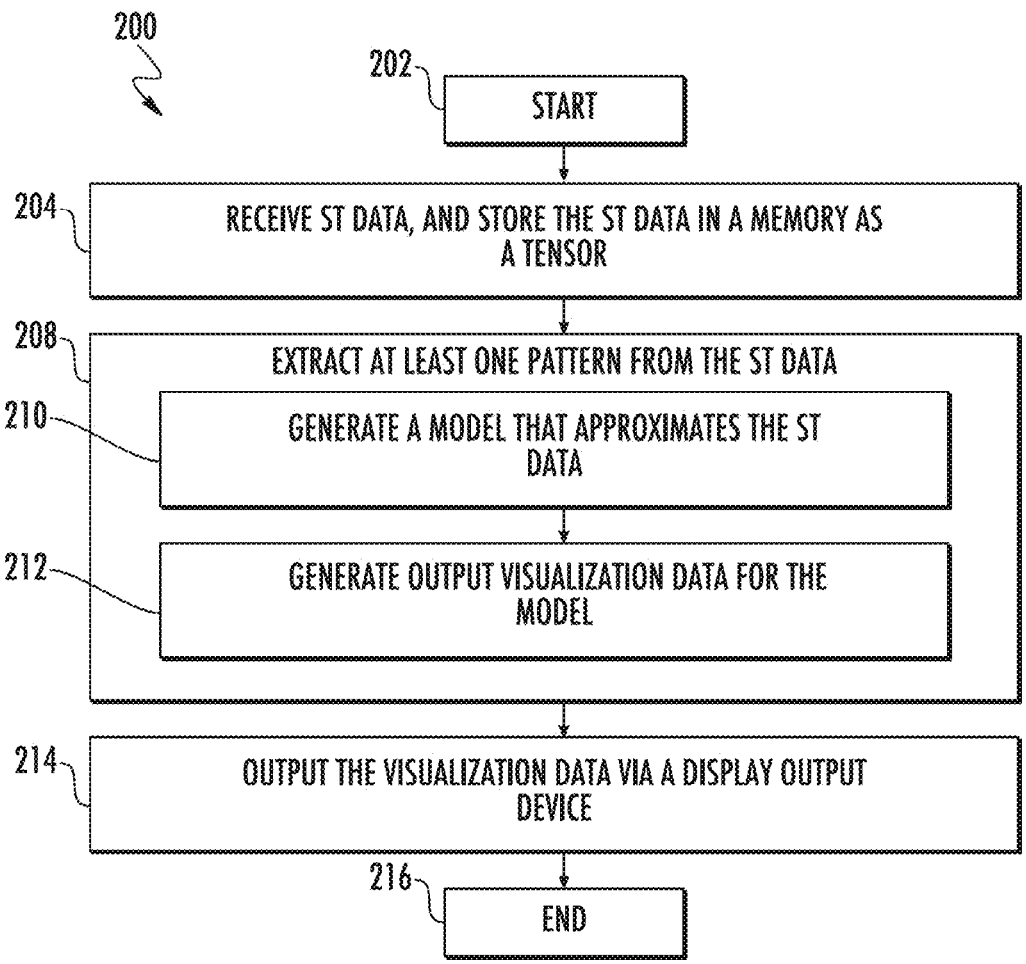
FIG. 2 is a block diagram of a process for extracting patterns from ST data, and generating visualizations of the extracted patterns.

FIG. 2 depicts a process 200 for extracting patterns from and generating visualizations of ST data. In the description below, a reference to the process 200 performing a function or action refers to the operation of a processor to execute stored program instructions to perform the function or action in association with other components in a graphical display system. The process 200 is described in conjunction with the system 100 of FIG. 1 for illustrative purposes.

At block 204, the processor 108 in the system 100 receives ST data, and stores the ST data as a multi-dimensional array in the memory 120. ST data includes a plurality of records, each of which includes descriptive information associated with spatial and temporal information. ST data can be represented in a variety of formats. In some embodiments, the ST data to be received is represented as a listing of records, such as a text file, table, data file, etc. In such embodiments, receiving the ST data includes converting the ST data so as to be represented by a multi-dimensional array. In some embodiments, the ST data to be received is already represented in the form of a multi-dimensional array.

At block 208, the processor 108 in the system 100 extracts a latent pattern from the received ST data. As discussed above, one possible goal of analyzing ST data is generally to uncover or extract latent patterns from the ST data. Since the patterns in ST data can be multi-dimensional and/or can vary across portions of a dimension, uncovering or extracting latent patterns from a complete ST data set can be difficult and computationally intense.

The pattern extraction (block 208) is performed with reference to the program instructions 132 in the memory 120, and includes generating a model or models 134 that approximates the ST data (sub-block 210), and generating output visualization data 136 corresponding to the generated model(s) (sub-block 212). Each of these sub-blocks 210 and 212 is discussed in further detail below. At block 214, the generated output visualization data 136 is outputted to the user via the display output device 154. In some embodiments, the pattern extraction (block 208) and output of the output visualization data 136 (block 214) is performed successively, in parallel, and/or iteratively, such as in response to the processor 108 receiving additional program instructions 132 for a user via the GUI.

With reference to sub-block 212, as noted above, generating a model representative of ST data generally includes applying simplifying assumptions or other techniques that reduce the complexity of the ST data. Reducing complexity can not only improve computational efficiency, but also put ST data in a form more adapted to uncovering and extracting latent patterns in the ST data, and more adapted to visualization in a manner easily comprehendible to a user. When ST data is represented as a multi-dimensional array, a reduction in complexity is generally is expressed as a reduction in the order of the multi-dimensional array. A reduction in order can dramatically reduce the computational resources needed to analyze a multi-dimensional array, and can enable visualizations that are more comprehendible to a user.

For example, consider the order 3 array of traffic flow data discussed above. A direct visualization of an order-3 array would require a 4-dimensional image, three axes for the three dimensions in the multi-dimensional array, and one axis for the values in each entry. Since the world is a 3-dimensional space, it can be difficult to represent a 4-dimensional image on the display output device 154, and can even be difficult for a user to understand such an image in an intelligible way. Moreover, visualizing ST data with a dimensionality higher than order 3 would require images of even higher dimension. Conversely, images with three or fewer dimensions are easily displayed and are more comprehendible to a user. An order-2 array can be visualized, for example, as a 2-dimensional heat map, a 3-dimensional graph or surface, or the like. An order-1 array can be visualized, for example, as a line graph, bar chart, 1-dimensional heat map, thematic map, etc.

Various types of models are usable for analyzing ST data sets. In some embodiments, the generation of a model of the ST data (sub-block 210) includes applying the aggregation technique introduced above to generate a model 134 of the ST data multi-dimensional array. Using this model, a dimension of the multi-dimensional array is collapsed by combining all of the entries along that dimension, such as via summation, averaging, or any other acceptable arrogation method, and as a result the order of the array is reduced by one. The aggregation technique can be repeated across multiple dimensions, whereby each iteration of the technique reduces the order of the array by one.

To continue with the traffic volume example, the traffic flow data set X is represented as an order-3 multi-dimensional array defined by:

$$X \in \mathbb{R}_{\geq 0}^{|P| \times |D| \times |T|}$$

where P is an indexed set of location regions on a map, D is an indexed set of days, and T is an indexed set of hours, such that the value at X[i,j,k] represents the traffic volume (e.g. total number of vehicles) at location i on the j-th day during hour k. While this example, and several of the examples below incorporate order-3 arrays, multi-dimensional arrays of various numbers of dimensions are used in different embodiments.

Using the aggregation technique, the processor 108 generates an order-2 array of the total traffic volume at different hours of each day by summing the values of X across the location dimension of the order-3 array. The processor 108 then generates an order 1 array of average traffic volume during different hours of the day by averaging the values of X across the day dimension. This order-1 array, which could be visualized, for example, as a line graph showing the average traffic volume over the course of a day, is much less computationally complex to visualize, and much more comprehendible to a user.

In some embodiments, the generation of a model of the ST data (sub-block 210) includes applying a technique referred to herein as tensor rank decomposition to model a multi-dimensional array of ST data as a tensor T A "tensor" refers to multi-dimensional array expressed as a linear combination of rank-one tensor components. A "rank-one" tensor is a multi-dimensional array that can be expressed as the outer product of vectors, e.g. ($\vec{a} \otimes \vec{b} \otimes \vec{c}$), whereby each of the vectors summarizes the variation of the rank-one tensor along the corresponding dimension. Vectors that form a rank-one tensor are referred to as the "loading vectors" for that rank-one tensor. Thus, an approximation of a multi-dimensional array X with dimension A, B, and C as a tensor T is given by:

$$X \approx T = \Sigma_{r=1}^{R} \lambda_r \vec{a}_r \otimes \vec{b}_r \otimes \vec{c}_r$$

The $\lambda_r$ term is a loading coefficient applied to each rank-one component, and roughly corresponds to the prominence of the expression of a particular component in the overall tensor T In other words, the loading vectors in the rank-one components of a tensor T are indicative of patterns in the multi-dimensional array, and the $\lambda_r$ term is indicative of the prominence of the patterns in one component relative to other components of the tensor. Generally, the components are expressed so that the loading coefficients are in descending order, such that the first sets of loading vectors correspond to the most prominent patterns in the multi-dimensional array.

Applied to the traffic volume ST dataset discussed above, the multi-dimensional array of traffic data X can be expressed as:

$$X \approx T = \Sigma_{r=1}^{R} \lambda_r \vec{p}_r \otimes \vec{d}_r \otimes \vec{t}_r$$

where $\vec{p}_r$, $\vec{d}_r$, and $\vec{t}_r$ are the normalized r-th loading vectors (i.e., patterns) in the r-th rank-one component of the tensor X The minimum number of rank-one tensors needed to fully express a tensor is referred to as the "rank" of the tensor.

Since the relation between the loading vectors $\vec{p}_r$, $\vec{d}_r$ and $\vec{t}_r$ and an overall tensor T is NP-hard, there is no finite algorithm for determining the decomposition of a tensor. Thus, loading vectors are generally computed iteratively, such as by using an optimization function to find a best fit for components that approximate the tensor T One benefit of such a procedure is that a reasonably accurate approximation of the tensor can be achieved using a relatively low number of loading vectors. In particular, to improve computational efficiency, the tensor T can be approximated as:

$$T \approx \hat{T} = \lambda_1 \cdot \vec{p}_1 \otimes \vec{d}_1 \otimes \vec{t}_1$$

which uses only the 1-st loading vectors $\vec{p}_1$, $\vec{d}_1$, and $\vec{t}_1$ representing the most prominent patterns in the multi-dimensional array X across each of the dimensions i, j, and k, respectively.

Since a tensor T is defined by loading vectors that summarize variation along the dimensions of the multi-dimensional array, the values of the entries in the tensor T may diverge from the values of the original data set X. This deviation can be expressed by the difference in the actual array X and the approximated tensor T defined by the loading vectors $\vec{p}_1$, $\vec{d}_1$, and $\vec{t}_1$, i.e. a residual multi-dimensional array expressed as:

$$X_{res1} = X - \hat{T} = X - \lambda_1 \cdot \vec{p}_1 \otimes \vec{d}_1 \otimes \vec{t}_1$$

In other words, the formulation of a rank-one approximation of T provides a quantitative measurement indicative of the accuracy of that approximation of the multi-dimensional array X A measurement of this accuracy can be used to improve the visualization of the ST data, as discussed in more detail below, and can also be used to facilitate the iterative computation of the best-fit approximation of the multi-dimensional array X Specifically, an optimization function for determining the approximation of the multi-dimensional array X can be expressed as a cost function that utilizes the residual multi-dimensional array, e.g.:

$$\text{cost} = \|X - \lambda_1 \cdot \vec{p}_1 \otimes \vec{d}_1 \otimes \vec{t}_1\| = \|X_{res1}\|$$

whereby the $\|\cdot\|$ operator denotes the Frobenius norm. A cost=0 indicates that the multi-dimensional array X itself is a rank-one tensor, and thus that the 1-st loading vectors represent the original ST data without loss of information. In many cases, however, the multi-dimensional array X is not a rank-one tensor, and thus an iterative process is used to determine 1-st loading vectors that minimize the cost function above.

Iterative methods generally iterate until reaching a maximum number of iterations, a minimum of change in the cost function over successive iterations, and/or a minimum cost, whereby each iteration generally includes making a small modification to the terms to be determined, which here include the loading vectors. While various methods of iteratively computing a best-fit rank-one approximation of a tensor have been developed, some methods can result in a negative 1-st loading vector that nevertheless results in an outer product tensor that is a good approximation of the original data. However, since the loading vectors here are used as approximations of the variation in the original data, a negative loading vector that nevertheless can be used to recover a good approximation tensor does not accurately summarize the variation in the original data. Thus, in order to maintain fidelity of the approximations of variation across the various dimensions in the ST data, iterative methods for computing the best-fit rank-one approximation of the multi-dimensional array X are constrained to be non-negative.

In one example, the alternating least square (hereinafter "ALS") algorithm is an acceptable method of iteratively computing the best-fit rank-one approximation of the multi-dimensional array X In particular, the ALS algorithm will always output non-negative 1-st loading vectors with non-negative initializations for tensors with nonnegative entries. Thus, in some embodiments, the generation of a model of the multi-dimensional array X (sub-block 210) includes using ALS tensor decomposition to compute 1-st loading vectors $\vec{p}_1$, $\vec{d}_1$, and $\vec{t}_1$.

In some embodiments, the generation of a model of the ST data (sub-block 210) includes applying a technique referred to herein as successive tensor rank decomposition. In some embodiments, the 1-st loading vectors are sufficient to summarize the variation across each dimension of the multi-dimensional array X In some embodiments, however, the variation across a dimension may be a composite of more than one pattern that extends across a dimension. An analogous example would be signals of different frequency that constructively and destructively interfere when observed simultaneously. Thus, while the 1-st loading vectors generally account for the most prominent pattern exhibited in the variation, it would be beneficial to account for other patterns via consideration of the loading vectors of further components of the tensor T.

This technique begins with tensor rank decomposition as discussed above. After the 1-st loading vectors $\vec{p}_1$, $\vec{d}_1$, and $\vec{t}_1$ and the residual multi-dimensional array $X_{res1}$ are computed, a successive round of tensor rank decomposition is applied to the residual multi-dimensional array. Using similar operation, the residual multi-dimensional array $X_{res1}$ can be approximated as:

$$X_{res1} \approx T_{res1} = \lambda_2 \cdot \vec{p}_2 \otimes \vec{d}_2 \otimes \vec{t}_2$$

and an iterative computation process can be performed in a similar manner in order to compute the 2-nd loading vectors $\vec{p}_2$, $\vec{d}_2$, and $\vec{t}_2$ using the cost equation:

$$\text{cost} = \|X_{res1} - \lambda_2 \cdot \vec{p}_2 \otimes \vec{d}_2 \otimes \vec{t}_2\|$$

The resulting 2-nd loading vectors $\vec{p}_2$, $\vec{d}_2$, and $\vec{t}_2$ represent a different pattern in the variation of the dimensions of the multi-dimensional array X, but like the 1-st loading vectors, the 2-nd loading vectors represent an approximation that summarizes across the entirety of their respective dimensions, and a further residual multi-dimensional array can be computed as:

$$X_{res2} \approx X_{res1} - \lambda_2 \cdot \vec{p}_2 \otimes \vec{d}_2 \otimes \vec{t}_2$$

Successive rounds of tensor rank decomposition can be applied to compute further loading vectors (3-rd, 4-th, etc.). In some embodiments, successive rounds are applied until the cost reaches a threshold minimum value. In some embodiments, successive rounds are applied until the cost=0. When the cost=0, the tensor X has been fully represented by rank-one tensors given by the loading vectors, and the successive tensor rank decomposition is referred to as a rank-one canonical polyadic (CP) decomposition (a.k.a. PARAFRAC/CANDECOMP). CP decomposition ensures that the fidelity of the underlying ST data is maintained. Thus, in some embodiments, the generation of a model of the multi-dimensional array X (sub-block 210) includes using CP decomposition to compute loading vectors 1 through r.

While the models described in the embodiments above provide approximations of the variation in the multi-dimensional array X across each dimension, the approximations are taken across an entirety of each dimension, and as noted above, approximations over an entire dimension do not account for variations in patterns that relate to more than one dimension or that vary within a dimension. For example as discussed above, traffic volume may exhibit consistent but different hourly patterns during weekdays and weekends. The order 1 array of traffic volume per hour in a day computed with the aggregation model and the loading vector, and the loading vector(s) $\vec{t}$ computed using the tensor decomposition models discussed above are each taken across an entirety of the day dimension d, and thus do not account for the variation between weekdays and weekends. In other words, the difference in patterns between subsets of the days is lost.

Figure 3:
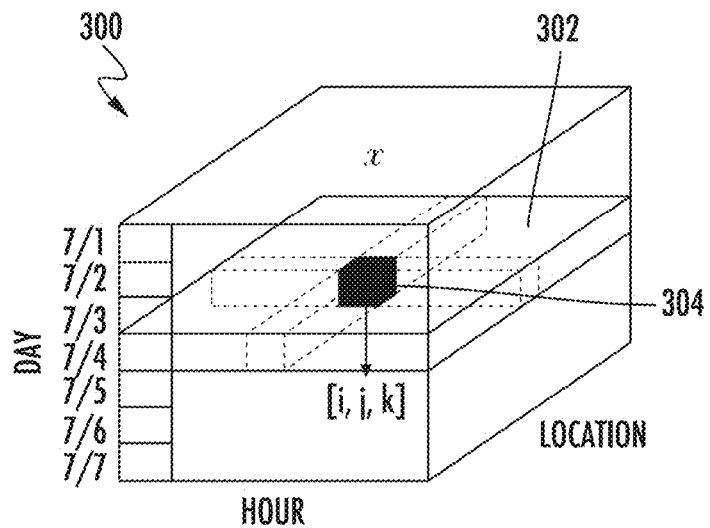
FIG. 3 is an image of an image of an exemplary embodiment of a multi-dimensional array of ST data.

One technique to uncover patterns or trends that are otherwise lost due to simplification of the data is to consider only a portion of the data at a time. FIG. 3 depicts an exemplary image 300 of the traffic volume multi-dimensional array X, whereby each of day, location, and hour defines an indexed axis in the image 300. The image 300 in FIG. 3 depicts a particular slice 302 of the multi-dimensional array, and a particular entry 304 in the ST data set located at indices i, j, and k in the image 300.

As used herein, the term "slice" means a portion of a multi-dimensional array or tensor across a fixed value for one of the modes. In the multi-dimensional array depicted in FIG. 3, a slice along the location mode at a fixed index i is defined as X[i,:,:], a slice along the day mode at a fixed index j is defined as X[:, j,:], and a slice along the hour mode at a fixed index k is defined as X[:,:,k]. Slice 302 located at the index "7/4" along the day mode is defined as [:, "7/4",:], and represents all of the entries in the ST data set corresponding to the day "7/4".

Comparison between individual slices can be used to find the average traffic volume per hour on different days. A user sifting through the different slices may be able to identify that the patterns of average traffic per hour of different days fall roughly into two different clusters, and might determine that one cluster corresponds to weekdays and the other to weekends. While these determinations may be conceivably possible for the set of 7 different slices corresponding to the 7 days of the week, similar determinations may be far more difficult to achieve when a dimension includes, for example, 20, 100, 1000, or more slices. As a result, using models that summarize ST data across entire dimensions may not facilitate uncovering or extracting patterns in large and/or highly dimensional ST data sets. Thus, a model that automatically accounts for variations in patterns across dimensions of ST data would be beneficial.

In some embodiments, the generation of a model of the ST data (sub-block 210) includes applying a modelling technique referred to herein as piecewise decomposition. As used herein, a "piecewise" modelling technique is a technique that automatically detects sub-tensors within a tensor T model of ST data that exhibit similar variation (i.e. patterns) along spatial, temporal, and/or other domain-specific dimensions.

In some embodiments, the generation of a model of the ST data (sub-block 210) includes applying a type of piecewise decomposition referred to herein as piecewise rank-one tensor decomposition. Using this technique, a model is generated by performing simultaneous tensor partitioning and multi-mode pattern extraction along a selected dimension of a tensor. With a selection of the dimension J of a multi-dimensional array X as a dimension on which to find partitions of the multi-dimensional array X, this generation is expressed as the optimization problem:

$$\operatorname*{argmin}_{P, \|P\|=k} \sum_{J \in P(\{1,\ldots,k\})} \left\| \mathcal{X}[:, J, :] - \lambda_1^J \cdot \vec{p}_1^J \otimes \vec{d}_1^J \otimes \vec{t}_1^J \right\|$$

where P is a subset of the indices along the selected dimension J that defines the location of partitions of the multi-dimensional array X, k is the number of partitions in the multi-dimensional array X, X [:, J,:] is a sub-array resulting from the partition P, and $\vec{p}_1^J$, $\vec{d}_1^J$ and $\vec{t}_1^J$ are the 1st loading vectors of the sub-tensor approximation of the sub-array X[:, J,:]. The terms within the Frobenius norm operator define the difference between the sub-array of the actual ST data set and the sub-tensor approximated by the 1-st loading vectors $\vec{p}_1^J$, $\vec{d}_1^J$ and $\vec{t}_1^J$, and thus indicate how accurately the 1-st loading vectors approximate the sub-array of the ST data set. The range J∈P({1, ..., k}) accounts for all possible quantities and locations of partitions within the multi-dimensional array X Thus, solving the optimization problem above by finding the argmin of all possible summations results in computation of partitions P of the multi-dimensional array X that optimize both the local accuracy of each approximated sub-tensor given by the 1-st loading vectors $\vec{p}_1^J$, $\vec{d}_1^J$ and $\vec{t}_1^J$, and the global accuracy of the approximation of the multi-dimensional array X as a whole.

Figure 4:
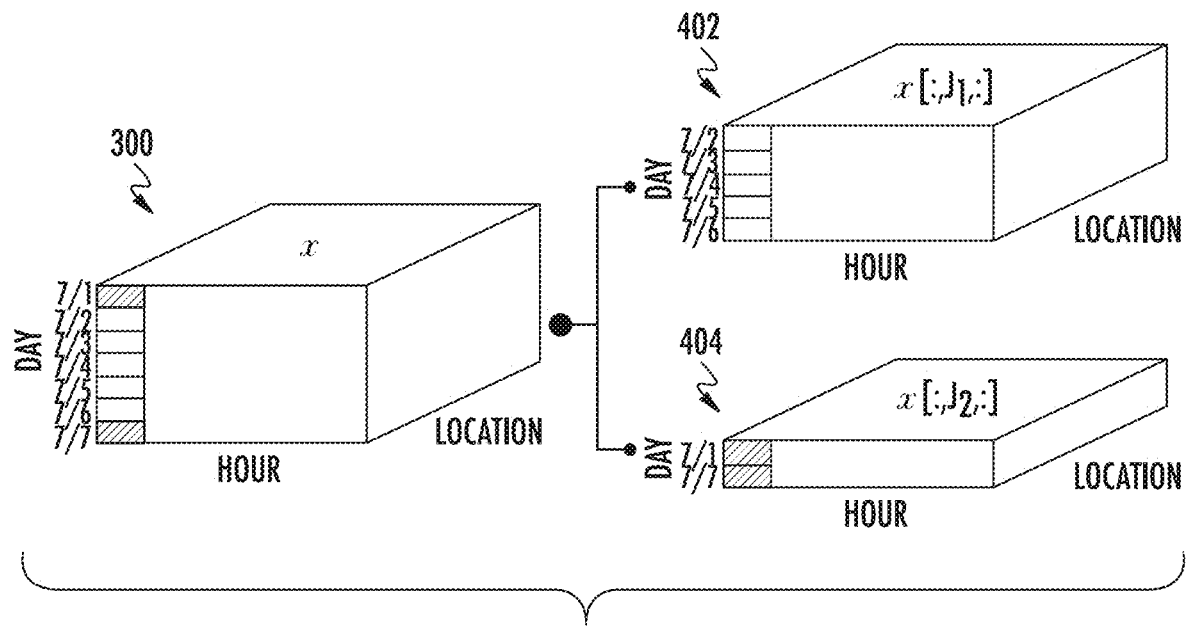
FIG. 4 is an image of an image of the ST data of FIG. 3 partitioned into sub-arrays.

FIG. 4 depicts the multi-dimensional array 302 of FIG. 3 partitioned into two sub-multi-dimensional arrays X[:, $J_1$,:] 402 and X[:, $J_2$,:] 404. It should be noted that, as depicted in FIG. 4, the clustering and partitioning of slices in the multi-dimensional array X is not constrained to slices that are adjacent to each other. For example, the weekend slices "7/1" and "7/7" are not adjacent in the multi-dimensional array X, but are nonetheless clustered together in the partitions 402 and 404. It should also be noted that while the above discussion relates to piecewise rank-one tensor decomposition along the J dimension, this method could be similarly performed across any dimension in a multi-dimensional array.

Since each sub-array formed by the partitions can be approximated by its own set of loading vectors that result in a respective sub-tensor, the different loading vectors for the different sub-tensors account for variations in the pattern across the J dimension. In other words, modeling the ST data using piecewise rank-one tensor decomposition automatically accounts for variations in 1-st rank patterns across dimensions of ST data. For example, applied to the traffic volume ST data set, solving the optimization problem above along the day dimension d results in a partitioning of the multi-dimensional array X into a first sub-array that includes the weekdays and a second sub-array that includes the weekends. The loading vectors $\vec{t}_1^J$ that approximate these sub-arrays would thus account for traffic patterns per hour during a weekday and during a weekend, respectively. However, as the size of the selected dimension increases, the set of possible partition quantities and location expands radically, with the result that solving for the argmin of the optimization problem can become non-trivial for large-sized selected dimensions. Thus, an optimization for computation of the optimization problem would be beneficial.

In some embodiments, the generation of a model of the ST data (sub-block 210) includes applying a technique referred to herein as flattened piecewise rank-one tensor decomposition to model the multi-dimensional array X This technique leverages low-dimensional feature vectors to optimize the computation of the optimization problem given above.

With a selection of the dimension J of a multi-dimensional array X, each slice X[:, j,:] is converted into a feature vector $x_j$ with length $\|P\| \times \|D\|$, which contains all of the entries from the corresponding day D(j). The feature vectors $x_j$ are clustered together, such as by using a clustering algorithm. Any acceptable clustering algorithm can be used, such as a hierarchical clustering algorithm, a self-organizing map algorithm, a k-means algorithm, a Density-based spatial clustering of applications with noise (DBScan) algorithm, an Ordering points to identify the clustering structure (OPTICS) algorithm, etc.

The resulting clusters J are used to define partitions in the multi-dimensional array X in order to form a respective sub-array for each cluster. The processor 108 can then generate a model 134 for each sub-array via rank-one tensor rank decomposition to determine the 1-st loading vectors for that sub-array. Generally, the computational cost of applying a clustering algorithm to a set of features vectors and then applying rank-one tensor rank decomposition on the resulting sub-arrays is less than the computational cost of computing a brute-force solution to the optimization problem given above for the entire multi-dimensional array. Thus, using flattened piecewise rank-one tensor decomposition to generate models for sub-arrays in the multi-dimensional array X can result in an improvement in efficiency relative to the piecewise rank-one tensor decomposition technique discussed above.

However, the piecewise decomposition techniques discussed above only assign partitions based on the 1-st loading vectors, and thus only account for patterns present in the 1-st rank components of the tensor X Thus, a model that automatically accounts for variations in variously ranked patterns across dimensions of ST data would be beneficial.

Referring again to FIG. 2, in some embodiments, the generation of a model of the ST data (sub-block 210) includes applying a technique referred to herein as piecewise successive rank-one tensor decomposition. This technique leverages 1-st to r-th loading vectors produced by successive rank-one tensor decomposition to generate low dimensional feature descriptors for the selected mode and then apply clustering algorithms to the low dimensional feature descriptors to automatically detect partitions for forming sub-tensors.

This technique beings with CP decomposition of the multi-dimensional array X, resulting in the computation of loading vectors $\vec{p}_1$, $\vec{d}_1$, and $\vec{t}_1$ through $\vec{p}_r$, $\vec{d}_r$, and $\vec{t}_r$. With a selection of the dimension J of a multi-dimensional array X, a feature vector $x_d$ is generated for each day j expressed as:

$$x_d(j)=[\vec{d}(j)_1 \ldots \vec{d}(j)_r]$$

The feature vectors $x_d(j)$ are then clustered together, such as via a clustering algorithm, and the resulting clusters are used to define partitions that separate the multi-dimensional array X into corresponding sub-arrays J. Loading vectors $\vec{p}_1^J$, $\vec{d}_1^J$ and $\vec{t}_1^J$ through $\vec{p}_r^J$, $\vec{d}_r^J$ and $\vec{t}_r^J$ can then be computed for each sub-array J using CP decomposition in order to extract the patterns exhibited in each sub-tensor. As discussed above, the computational cost of applying a clustering algorithm to a set of features vectors and then applying CP decomposition is generally less than the computational cost of computing a brute-force solution to the optimization problem given above to the entire multi-dimensional array. Thus, using piecewise successive rank-one tensor decomposition to model the multi-dimensional array X can result in an improvement in efficiency relative to the piecewise rank-one tensor decomposition technique discussed above. Further, since the clustering of days j in this technique accounts for patterns in the 1-st through r-th rank, rather than only in the 1-st rank, this technique can enable more patterns to be extracted or uncovered, and can improve an accuracy of the approximation of the multi-dimensional array X compared to the piecewise decomposition techniques discussed above.

In some embodiments, the generation of a model of the ST data (sub-block 210) additionally includes computing an evaluation of the model(s) 134. Since the generation of a model 134 can sometimes result in a simplification of the ST data set, the model 134 may not be wholly accurate to the underlying ST data. In other words, the loading vectors determined during model generation form, in each case, an approximation $\hat{X}$, of the multi-dimensional array whereby individual entries in the tensor defined by the loading vectors $\hat{X}(i,j,k)$ may differ from the original entries in the ST data $X(i,j,k)$. The deviation between $\hat{X}$ and X can be expressed as a deviation array given as:

$$\Delta[i, j, k] = \frac{\hat{X}[i, j, k] - X[i, j, k]}{X[i, j, k]}$$

However, since the deviation array is an array with the same size and dimensionality as the original multi-dimensional array X, the same difficulties in visualizing and comprehending the multi-dimensional array X are also true of the deviation array. Thus, in some embodiments, a summarization of the deviation array is used to evaluate the generated model.

In some embodiments, the deviation array is used to determine a discrepancy between a computed loading vector and the underlying ST data. The deviation tensor is summarized by computing quartiles for each mode of the deviation tensor. For example, quartiles on the K dimension are given as:

$$Q_{1/4}(\Delta[:,:,k]), Q_{1/2}(\Delta[:,:,k]), Q_{3/4}(\Delta[:,:,k])$$

The computed quartiles can be understood as a normalized deviation (between 0% and 100%) of the computed loading vectors and the underlying ST data. The higher the deviation, the less accurately the latent pattern in the computed loading vector fits the actual ST data.

In some embodiments, the deviation array is used to determine a discrepancy between sub-sets of the ST data. The deviation tensor is summarized by computing the average deviation of the multi-dimensional array or sub-array over each mode. For example, along the K mode, the average deviation for the multi-dimensional array X over the dimension I, and J dimensions for each slice k is given as:

$$\text{avg}(|\Delta[:,:,k]|)$$

The average deviation of each slice k can then be compared in order to determine, for example, the accuracy of the fit of the latent pattern in the loading vectors to the slices, or a variation in pattern between different slices.

In some embodiments, the generation of a model 134 of the ST data (sub-block 210) is performed multiple times for different sub-sets of the ST data. For instance, as discussed above, in some embodiments, the generation of a model of the ST data includes partitioning a multi-dimensional array representative of the ST data into sub-arrays. Models for such sub-arrays can be generated using similar procedures. As an example, consider the multi-dimensional array X of traffic volume data discussed above that has been partitioned into sub-arrays 402 and 404 for the weekday and weekend days, respectively. These sub-arrays can be modeled in order to extract or uncover sub-patterns exhibited in the sub-tensors.

In some embodiments, such sub-patterns include sub-patterns in the same mode as the previous partitions of the multi-dimensional array X For example, performing a piecewise decomposition technique on the day mode of the weekday sub-array 402 could reveal a difference in traffic patterns between Monday-Thursday, and Friday. The sub-array 402 can be further partitioned along the day mode, resulting in a sub-sub-array, and further loading vectors of the further sub-tensors can be computed.

In some embodiments, sub-patterns include sub-patterns in a different mode from the previous partitions of the multi-dimensional array X For example, referring again to the partitioning of the multi-dimensional array X depicted in FIG. 4, performing a piecewise decomposition technique on the hour mode of the weekday sub-array 402 could reveal a difference in traffic patterns between the morning hours (6 AM to 10 AM) and evening hours (4 PM to 8 PM). The sub-array 402 can be further partitioned along the hour mode, resulting in a sub-sub-array, and further loading vectors of the further sub-tensors can be computed.

Under similar procedures, models 134 can be generated for various combinations of sub-arrays resulting from previous rounds of model generation. In some embodiments, an additional round of model generation is applied to a sub-array based on a criterion. Criteria in different embodiments include one or more of a threshold average deviation of slices from the loading vector over at least one mode, a threshold variation of the average deviation of slices, a threshold quantity of slices in the multi-dimensional array or sub-array, etc. In some embodiments, an additional round of model generation is applied in response to an instruction received via a graphical user interface, as discussed in further detail below.

Referring again to FIG. 2, the processor 108 generates output visualization date 136 of the model 134 (sub-block 212) in order to convey the model 134 and any extracted patterns in the ST data to the user. In some embodiments, the generation of output visualization date 136 of the model 134 (sub-block 212) includes generating at least one of a view, chart, and graph of the model. Various types of acceptable views, charts, and graphs are used in different embodiments. In some embodiments, the views, charts, and graphs used in a visualization are based on at least one of the size and/or dimensionality of the ST data, and the model generated to represent the ST data.

As noted above, while the indices of a multi-dimensional array are integer values, the dimensions of the multi-dimensional array can refer to a variety of types of data, such as categorical, numerical, etc., whereby the records in the ST data were binned across the indices of the various dimension for representation as a tensor. Recovering the type of data for each dimension may be beneficial for visualizing the ST data along that dimension. For example, geographical, temporal, and numerical domains are, in many cases, continuous, while these domains may have been binned into nominal units for construction of the tensor (e.g. states, cities, zones for geographical domains, days, hours, months for temporal domains, and equal-sized and adjacent intervals for numerical domains).

Figure 5:
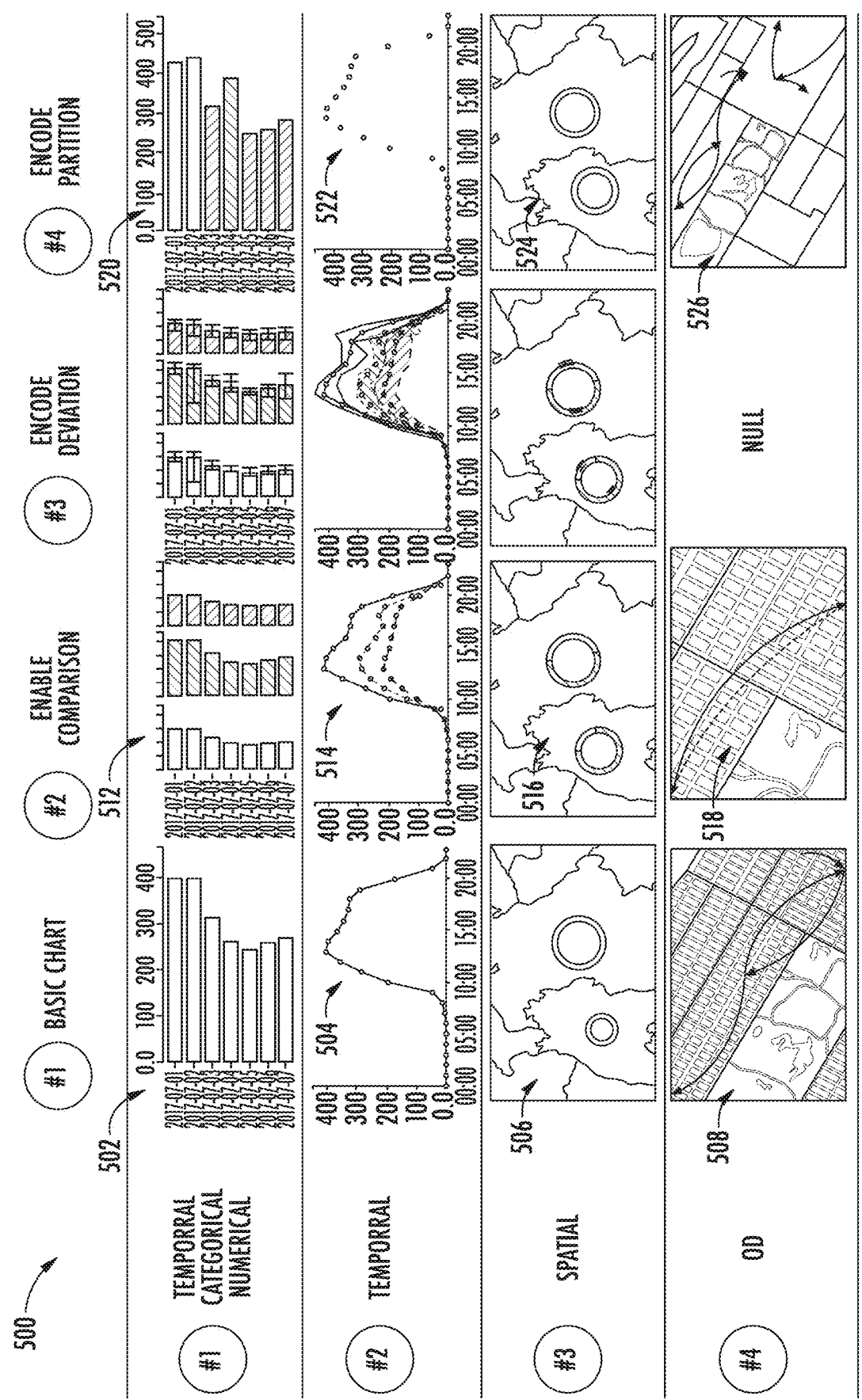
FIG. 5 is a table illustrating examples of charts, graphs, and images for visualizing patterns extracted from ST data.

FIG. 5 depicts a table 500 of examples of different types of views, charts, and graphs that can be generated by the processor 108 to visualize models 134 of ST data such as the models discussed above. Each row (1-4) includes a different type of chart, view, or graph that can be used to depict loading vectors of different modes.

Column 1 includes charts, views, and graphs that visualize 1-st loading vectors of a tensor X Column 1, row 1, depicts a bar chart 502 of total traffic volume on each day, and column 1, row 2 depicts a line graph 504 of average traffic volume during each hour of a typical day. The bar chart 502 and line graph 504 can be used to directly visualize a loading vector. While both the bar chart 502 and line graph 504 examples in table 500 depict values (e.g. total or average traffic volume) distributed over a temporal dimension, any dimension in the tensor X can be used as one of the axes in the charts or graphs. For example, a chart could be used to depict the total sales volume of each product in a product line, and a line graph could be used to depict average passenger quantity for taxi trips distributed along an axis of total trip distance. Generally, a chart can be used to highlight individual values, while a line graph can be used to illustrate trends, but various charts and graphs are used for various purposes in different embodiments. Further, while the chart 502 is a bar chart, and while the graph 504 is a line graph, any acceptable type of chart or graph can be used.

Column 1, row 3 is a thematic map 506. Specifically, the thematic map 506, in this embodiment, is a bubble map that depicts, for example, the total traffic volume in each region of the map, whereby the volume of the bubble in each region is indicative of the numerical value of the traffic volume. Other types of thematic maps are used in other embodiments. For example, column 1, row 4 is a thematic map 508 that, in this case, is a flow map that depicts curves connecting origin and destination locations of taxi travel data.

In some embodiments, the visualization includes two or more charts, graphs, or views. Since the different charts, graphs, and views are all representative of the same ST data multi-dimensional array, the different charts, graphs, and views are interrelated. In some embodiments, the visualization is configured to interact with a graphical user interface (GUI), whereby when a user selects a location or portion of a chart, graph, or view, that location or selection is highlighted in at least one other chart, graph, or view. In an example, when a user selects a particular day bar in the bar chart 502, a new line graph corresponding only to that day is generated, additional bubbles for each region indicative of the traffic volume in that region corresponding to the selected day are generated, etc. Further aspects of such a GUI are discussed in further detail below.

Column 2 includes charts, views, and graphs similar to column 1, but that the tensor for the ST data has been partitioned along a dimension other than along the loading vectors depicted in the chart, graph, or view, in each case. For example, row 1, column 2 depicts a juxtaposed set of bar charts 512 that depict the total traffic volume on each day, partitioned into discrete segments representative of, for example, morning, midday, and evening. Juxtaposition enables a user to visually inspect the load vectors of different partitions in a side-by-side comparison. Row 2, column 2 depicts a superimposed set of line graphs 514 that depict average traffic volume during each hour of a typical day, partitioned into discrete segments representative of, for example, Mon-Thurs traffic, Friday traffic, and weekend traffic. Superposition enables simultaneous comparison of different partitions so as to, for example, highlight differences in trends in the different partitions. The thematic maps 516 and 518 in column 2, rows 3 and 4, respectively, use color to differentiate between displayed data originating from different partitions. The bubble map 516 uses colorized portions of a circumference of the bubbles to indicate the size of each partition, but other types of glyphs and legends are used in other embodiments.

Figure 6:
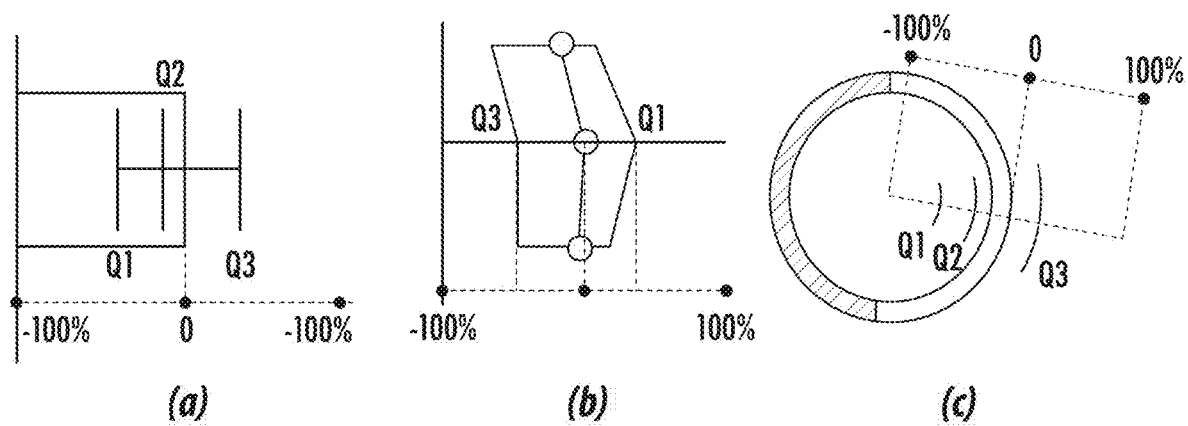
FIG. 6 is a group of detail images from the table in FIG. 5.

Column 3 depicts charts, graphs, and views similar to those in column 2, but additionally includes the deviation between the loading vectors and the raw ST data encoded into each of the visualizations, respectively. Note that the visualization in column 3, row 4 is null, since the thematic map 518 in column 2, row 4 is already canonical (no deviation from the raw ST data). FIG. 6 depicts detail views of a bar chart (a), line graph (b), and bubble map (c) that illustrate an exemplary embodiment for encoding the quartiles discussed above. In the bar chart (a) and bubble map (c), the quartiles are encoded as deviation brackets overlaid on top of the visualization. In the line graph (b), the quartiles are encoded as a shaded width surrounding each data point in the loading vector. Other types of encoding are also used in other embodiments.

Referring again to FIG. 5, column 4 includes charts, views, and graphs similar to column 1, but that the tensor for the ST data has been partitioned along a dimension along the loading vectors depicted in the chart, graph, or view, in each case. For example, column 4, row 1 depicts a bar chart 520 that shows total traffic volume on each day, whereby coloring has been used to indicate a partitioning of the ST data tensor into a weekend partition ("7/1" and "7/2"), a holiday partition ("7/4") and a remaining weekday partition ("7/3", "7/5", "7/6", and "7/7"). Column 4, row 2 depicts a point graph 522 that used colored data points to indicate a partitioning of the ST data tensor into an off-hours portion (22:00 through 8:00), daytime portion (8:00 through 18:00), and evening portion (18:00 through 22:00). In the bubble map 524 in column 4, row 3, coloring has been used to indicate a partitioning of the ST data tensor by region, and in the travel map 526 in column 4, row 4, coloring has been used to indicate a partitioning of the ST data tensor by region of trip origin.

While the examples discussed above used coloring, juxtaposition, and superposition to depict different partitions, other schema for depicting different partitions are also used in other embodiments such as, for example, shading, glyphs, highlighting, etc.

Figure 7:
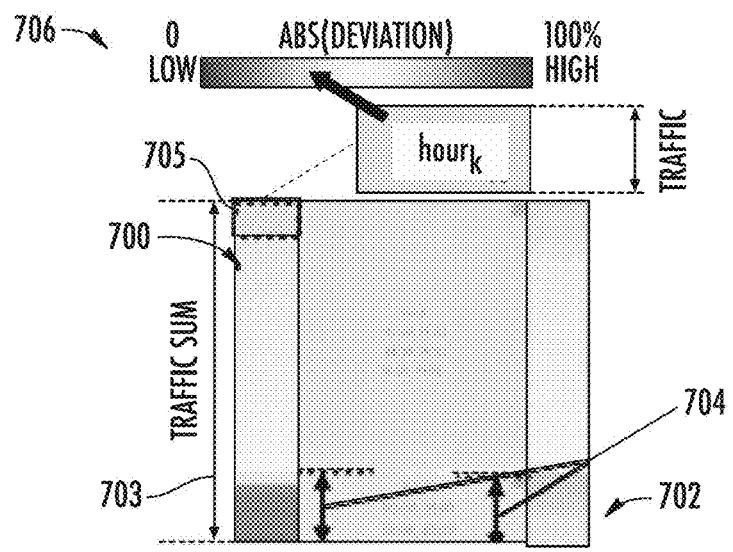
FIG. 7 is an image of an exemplary embodiment of a node chart visualizing ST data.

Visualizing the multi-dimensional array for the ST data as a whole and/or sub-arrays partitioned from the ST data multi-dimensional array can also be beneficial to convey how the ST data is being analyzed, and how the patterns extracted via loading vectors pertains to the ST data as a whole. FIG. 7 depicts and exemplary node chart for visualizing the traffic load multi-dimensional array X as a node 700 and a sub-array $X[:, J_1,:]$ as a sub-node 702 along the day dimension k. Similar node charts can be made for the tensor X and corresponding sub-arrays along different modes of the tensor X The height 703 of the node 700 is proportional to the total of the entries in the multi-dimensional array or sub-array, e.g. the total traffic volume aggregated over all of the days, hours, and regions. Similarly, the height 704 of the sub-node 702 and of the link between the node 700 and the sub-node 702 is proportional to the aggregated entries from the corresponding partition of the multi-dimensional array forming the sub-array.

Each of the node 700 and the sub-node 702 are separated into blocks (e.g. block 705 in the node 700) corresponding to each individual slice in that node or sub-node for a selected mode. The height of each block is proportional to the aggregated entries in the corresponding slice of the multi-dimensional array or sub-array. Each block is colored based on a gradient corresponding to the normalized average deviation for the corresponding slice between the entries in the raw ST data and the entries in the approximated tensor recovered via the loading vectors, as indicated by the deviation legend 706. This type of visualization can enable a user to see how ST data is distributed and partitioned, and how closely the data within a partition correlates with each other.

Referring again to FIG. 2, the generated output visualization data 136, is outputted to the user via the display output device 154. In some embodiments, the output visualization data 136 includes a GUI configured to interact with the input device 150 of the system 100. The following is a general overview of several features of an exemplary embodiment of a GUI usable with the output visualization data 136. Specific examples of a GUI are provided in the Experimental Results section below.

In some embodiments, the GUI includes tools that enable a user to select a type of modelling technique to use for representing the ST data, such as a list selection field. In some embodiments, the processor 108 automatically selects a model for representing the ST data based on, for example, the size, dimensionality, type, complexity, and/or variation of the ST data.

In some embodiments, the GUI includes tools that enable a user to select a mode along which partitions in the ST data tensor are to be determined. In some embodiments, the processor 108 automatically generates different models with partitions along different dimensions of the ST data tensor. In some embodiments, the processor 108 automatically selects a particular dimension for determining partitions based on, for example, a size of the dimensions, a variation of the data along each dimension, and/or the average deviation of slices of the ST data tensor along each dimension. In some embodiments, the processor 108 automatically generates different models with partitions along different dimensions of the ST data tensor, and recommends or selects one of the different models for visualization based on, for example, the cost function or the argmin optimization value computed for the different models, and/or the average deviation of slices of the ST data tensor along each dimension.

In some embodiments, the GUI includes tools that enable a user to select a clustering algorithm to be used when modeling the ST data.

In some embodiments, the GUI includes tools that enable a user to specify a number of partitions to compute along a selected mode. In some embodiments, the processor 108 automatically determines a number of partitions that optimizes the accuracy of the loading vectors with the underlying ST data. In some embodiments, the GUI includes tools that enable the user to modify the visualizations, such as via resizing, highlighting, repositioning, recoloring, etc.

In some embodiments, the GUI includes tools that enable the user to steer the course of successive rounds of model generation. For example, a first round of model generation could result in visualization of the multi-dimensional array X partitioned into sub-arrays $X_1$ and $X_2$ along the k dimension. A node chart in the visualization similar to the node chart 700 in FIG. 7 may indicate to the user that there is high variability in the deviation of the slices in sub-array $X_1$, which may be indicative of an additional variation in pattern within the sub-array $X_i$ along the k dimension. The user may then direct the processor 108 via the GUI to perform a successive round of model generation on the sub-array $X_1$ in order to determine additional partitions of the sub-array $X_1$ along the k dimension, i.e. one or more sub-sub-array $X_{1-1} \ldots X_{1-n}$.

In another example, a different visualization could reveal a variability in the deviation of the sub-array $X_1$ along a dimension other than the dimension k, which may be indicative of a variation of pattern in the sub-array $X_1$ along a different dimension. The user may then direct the processor 108 via the GUI to perform a successive round of model generation on the sub-array $X_1$ in order to determine additional partitions of the sub-array $X_1$ along the other dimension, i.e. one or more sub-sub array $X_{1-1} \ldots X_{1-m}$.

The models resulting from the successive model generation could then be visualized in a similar manner as the previous visualization. The user could also use the GUI to direct the processor 108 to perform further successive model generations in order to reveal further patterns that may be present in further sub-sets of the ST data.

EXPERIMENTAL RESULTS

The following experimental results illustrate how models and visualizations such as those discussed above are used to extract and/or reveal latent patterns in various sets of ST data.

Experiment 1—Regional Sales Data

An ST data set of regional sales data contains 2 million sales records of a product portfolio in Germany over a two-year period. Each record follows the schema: (month; product; state)→sales_volume. Under this schema, the records span a total of 24 months, 34 products, and 16 federal states. This ST data set was fed into a system 100, whereby a processor 108 received the ST data by constructing a 24×34×16 ST data multi-dimensional array, where each entry records the total sales in a particular month within a particular state for a particular product.

As shown below, the modeling and visualization of this ST data set enables a user to discern patterns in product segmentation (i.e. groupings of products with similar demand distributed over time and geographical regions), temporal comparison (i.e. the distribution of sales over different products for selected time intervals, and market segmentation (i.e. groupings of the federal states with common characteristics such as shared need for sets of products or similar temporal variation in sales.

Figure 8:
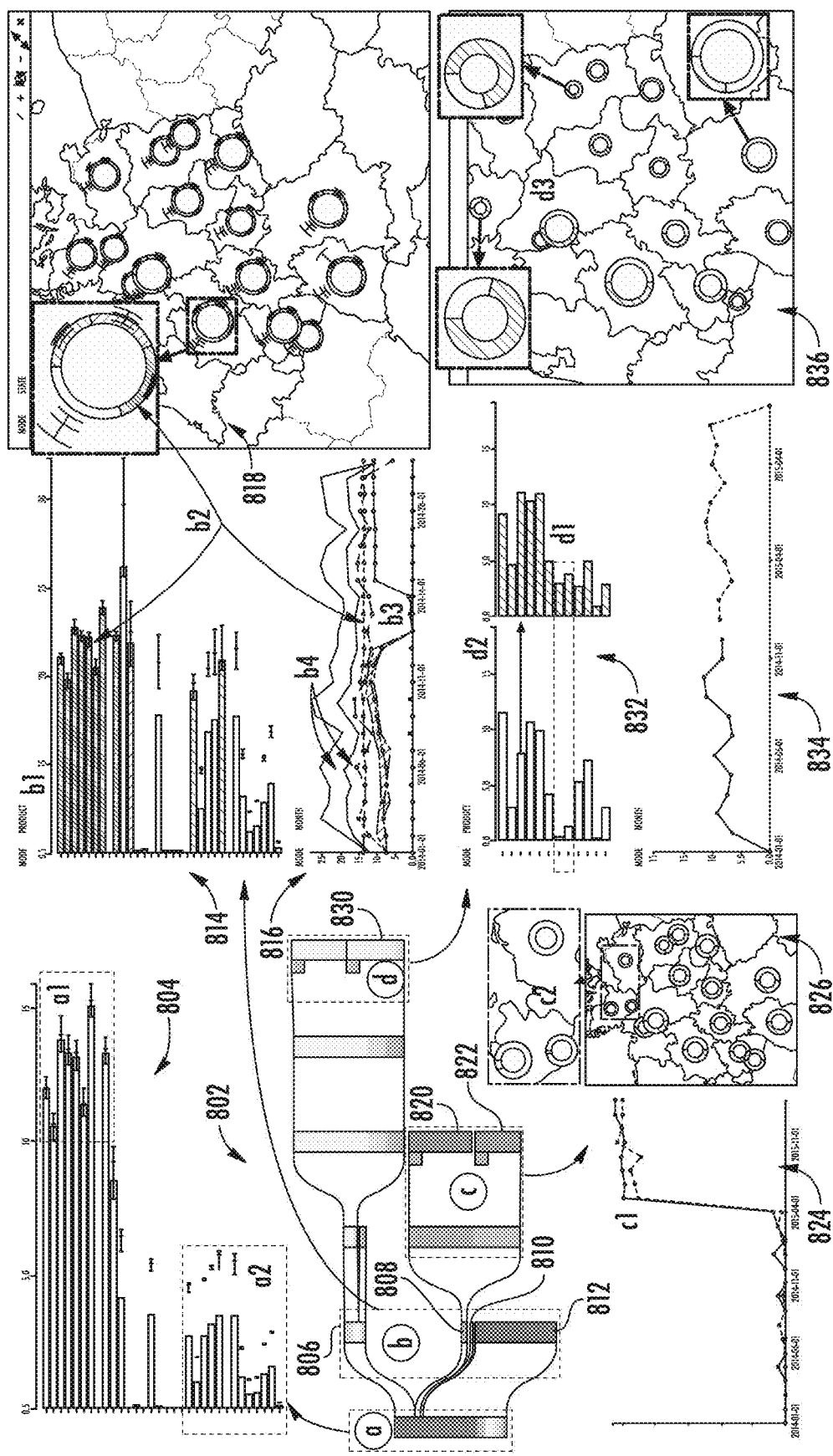
FIG. 8 is an image of a visualization resulting from experimental pattern extractions using the system of FIG. 1 and the process of FIG. 2.

FIG. 8 depicts the visualization of the ST data set after several successive rounds of model generation. To analyze the product segmentation of the products, a first round of model generation (a) resulted in a node chart 802 of the ST data along the product dimension, and an associated bar chart 804 depicting total sales for each product. The size and coloration of the blocks in the node chart 802, as well as the size of the bars and the deviation brackets in the bar chart 804 indicate that products having a relatively large amount of sales (larger blocks, and 8(*a*1)) have relatively small deviations, while products having a relatively large amount of sales (smaller blocks and 8(*a*2) have relatively larger deviations.

As a result, the user decided to partition the ST data multi-dimensional array into sub-tensors corresponding to larger and smaller amounts of sales, and directed the processor 108 via the GUI to perform a second round of model generation (b) resulting in sub-nodes 806, 808, 810, and 812 as well as several additional visualizations. A bar chart 814 depicts the same data as the bar chart 804, but has been colorized to differentiate between the partitions in the ST data corresponding to the nodes 806, 808, 810, and 812. A line graph 816 depicts the temporal variation in the total sales of the products in each partition. A bubble map 818 depicts the spatial distribution of the products in each partition amongst the federal states of Germany.

The pink partition 8(*b*1) has low deviation across every dimension (see 8(*b*2)) which indicates that the products in this group have very similar monthly and spatial sales variation, and thus the user determined that further partitioning of the segment 8(*b*1) was unnecessary. The purple group only includes 1 product, as shown in the bar chart 814, and thus further partition was also unnecessary. The orange group contained 2 products that exhibited significant temporal variation in the line graph 816.

As a result, the user decided to partition the orange group into individual products, and directed the processor 108 via the GUI to perform a third round of model generation (c) on the orange partition along the product dimension, resulting in sub-nodes 820 and 822 as well as a line graph 824 and bubble map 826 corresponding to the sub-nodes 820 and 822. Note that the relatively small sub-node 808 for the orange group was enlarged during the model generation (c) in order to improve the visibility of the sub-nodes 820 and 822. While the line graph 824 depicts similar sales patterns over time 8(*c*1), and bubble map 826 reveals that the orange product has almost no sales in the northern regions 8(*c*2).

To analyze the temporal comparison of the various products, e.g. the fluctuating sales of the green partition over time in the line graph 816 indicted by the high deviation 8(*b*4), the user decided to partition the ST data set along the months dimension, and directed the processor 108 via the GUI to perform a fourth round of model generation on the green partition along the month direction, resulting in sub-nodes 828 and 830, as well as a juxtaposed bar chart 832 a superimposed line graph 834, and a bubble map 836 corresponding to the sub-nodes 828 and 830. These visualizations reveal several patterns. Two products 8(*d*1) exhibited a sharp increase in sales in 2015. A third product 8(*d*2) became the sales leader by the end of the second year. The bubble map 836 revealed that while many states have similar sales of the products in the green partition year over year, several states are outliers 8(*d*3) that had very different sales over the two years in the data set.

Figure 9:
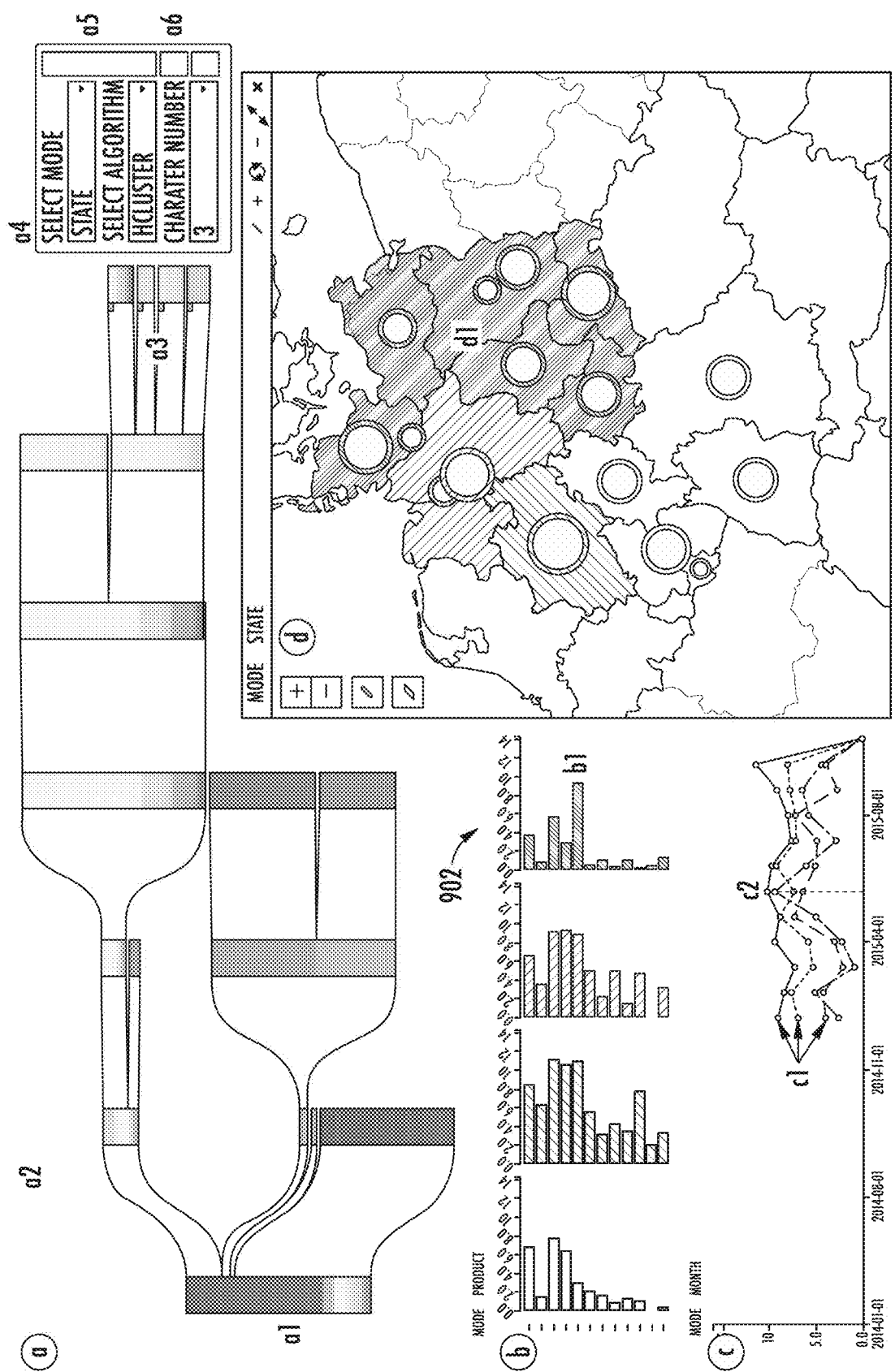
FIG. 9 is an image of another visualization resulting from experimental pattern extractions using the system of FIG. 1 and the process of FIG. 2.

To analyze the market segmentation, the user directed the processor 108 via the GUI to generate a new model of the ST data set along the state dimension instead of the product dimension. FIG. 9 depicts visualization of the ST data set after several successive rounds of model generation, whereby similar considerations as those discussed above with regard to FIG. 8 were used to further sub-divide the data set, as depicted in the node chart 9(*a*1), bar chart 9(*b*2), line graph 9(*c*), and bubble map 9(*d*).

FIG. 9 additionally depicts several exemplary elements of the GUI, such as tools 902 for resizing, editing, moving, and deleting visualizations, tools 9(*a*2) for manipulating nodes in the node chart 9(*a*), as well as tools 9(*a*3) for selecting sub-nodes, tools (*a*4) for setting properties of a successive round of model generation, tools 9(*a*5) for directing the processor 108 to perform the set successive round of model generation, and tools 9(*a*6) for expanding a selected node.

Experiment 2—Customer-in-Store Traffic Data

Customer in-store traffic data includes 25 million records from a large department store in the U.S. in July 201x. record is generated when a person enters or leaves a particular area in the store and a schema for the records is (record_id; retail_area_id; event_timestamp; event_type), where event_type includes the cases enter and leave. These records were aggregated to form area statistic with a schema of (day×hour×retail_area_id)→traffic_volume), which records the number of customers that pass through a particular area during a particular hour in a particular day. In total, the records included 31 days, 24 hours, and 163 different areas in the store, resulting in construction of a 31×24×163 multi-dimensional array. Different from the previous experiment, this multi-dimensional array contains two temporal dimensions (i.e., days and hours).

Figure 10:
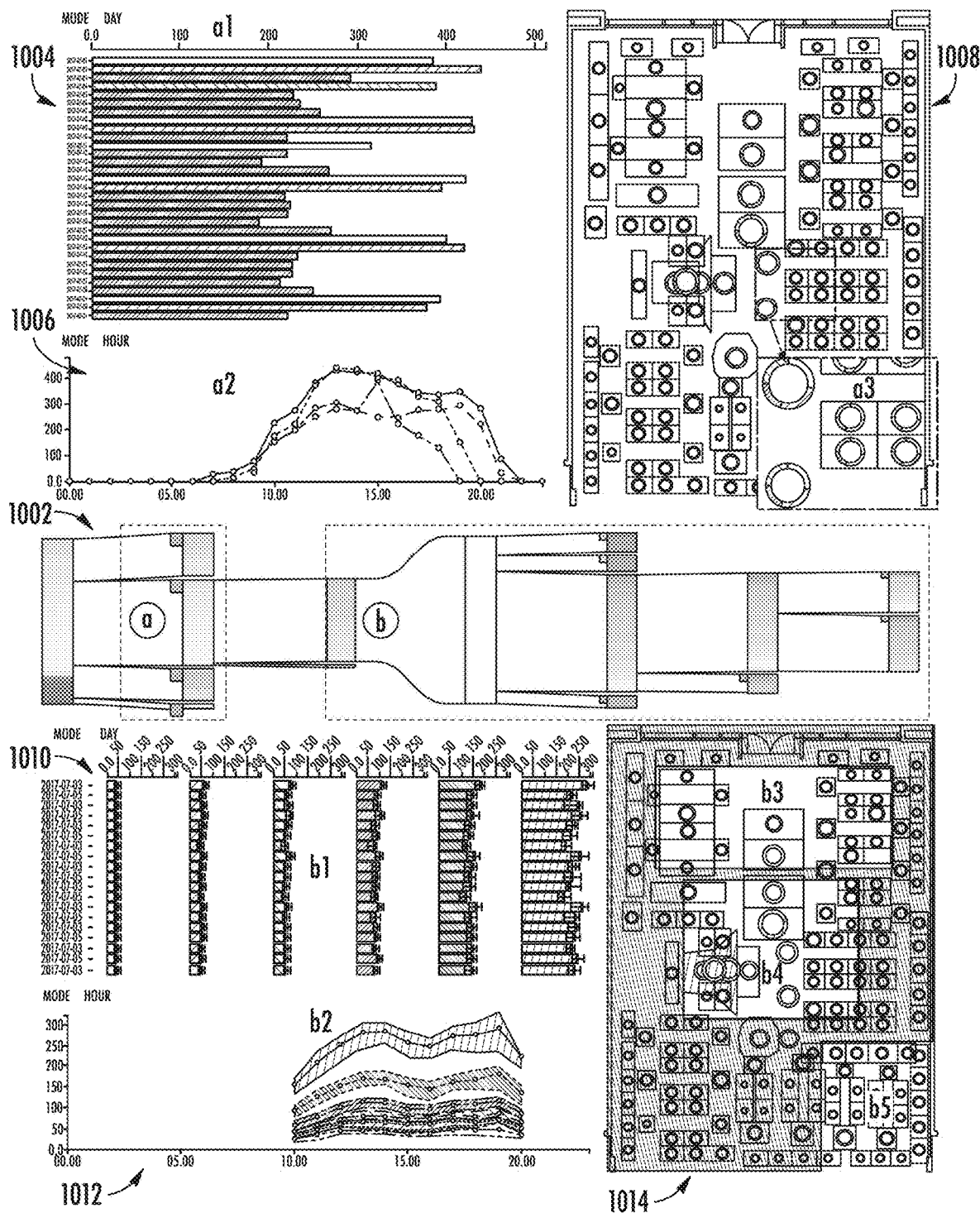
FIG. 10 is an image of another visualization resulting from experimental pattern extractions using the system of FIG. 1 and the process of FIG. 2.

As shown below, the modeling and visualization of this ST data set enables a user to discern daily periodical patterns in customer traffic in order to understand how the hour of the day affects the traffic, and how different days are similar or different from each other, and examine retail area performance in order to understand how the performance of retail areas changes based on temporal variations in traffic volume. FIG. 10 depicts visualization of the ST data set after several successive rounds of model generation.

To analyze daily periodical patterns in customer traffic, a first round of model generation 10(*a*) resulted in a node chart 1002 of the ST data along the day dimension, whereby the ST data was split into 4 groups, green, pink, orange, and purple. The model generation 10(*a*) also resulted in a corresponding superimposed bar chart 1004, line graph 1006, and bubble map 1008. In this experiment, the user selected the OPTICS clustering algorithm for clustering the days in the ST data, which automatically selects a number of partitions to be formed. As shown in the bar chart 1004, the pink group corresponds to weekdays, with the exception of one day in the purple group corresponding to a holiday, and the green and orange groups correspond to Saturdays and Sundays, respectively. As depicted in the line graph 1006, the weekends (orange and green) included a larger number of customers than weekdays, but that customers tend to leave earlier on Sunday than Saturday. Customers on the holiday (purple) left even earlier. As depicted in the bubble map 1008, most store regions experienced similar customer distributions regardless of day of the week, suggesting that the overall traffic distribution over different retail areas has no clear difference over different days.

To analyze retail area performance, the user used the GUI to manually direct the processor 108 to partition the ST data along the hour dimension in order to separate out the daytime hours from 10 am to 8 pm from the rest of the ST data 8(*b*) as a sub-portion. The user used the GUI to direct the processor 108 to automatically partition this sub-portion of the data 10(*b*) along the retail area dimension into groups of retail areas with similar traffic volume during the hours of 10 am to 8 pm, which resulted in a juxtaposed bar chart 1010, a superimposed line graph 1012, and a bubble map 1014, which are color-coded to distinguish between the groups of retail regions identified by the processor 108. As depicted in the line graph 1012, the different regions have different average magnitudes of traffic (each group 10(b2) is at a different height in the graph 1012), but the pattern of changing traffic in all of the groups appears to be similar. The bar chart 1010 depicts a similar trend. From the bubble map 1014, it appears that traffic rises with proximity to the entrance of the store at the top.

Experiment 3—New Your Taxi Trip Origin-Destination Data

Publically available New Your Taxi Trip Origin-Destination Data from 2016 includes records that each correspond to a particular taxi trip, and contains a pickup timestamp, a dropoff timestamp, a pickup taxi zone, a dropoff taxi zone, a passenger count, a trip distance, a fare amount, and a tip amount. Publically available taxi region data includes records of the division of New Your City into taxi zones, where each record includes the name, borough, and geometry boundaries for each taxi zone. These records were combined to form an ST data set that the processor 108 received and stored as a tensor with the schema (day×pickup_hour×pickup_zone×dropoff zone)→passenger count. It should be noted that in this schema, the entry for the passenger count does not necessarily only correspond to a single trip, as multiple trips on the same day within the same hour with the same pickup and droppoff zones were binned together in a single entry. The records included over 10 million taxi trip records, and 67 taxi zones over the course of the month of July 2016. The 31 days, 24 hours/day, 67 potential pickup zones, and 67 potential dropoff zones resulted in a 31×24×67×67 multi-dimensional array. Tensor decomposition was used to determine 1-st loading vectors $\vec{d}_1$, $\vec{t}_1$, $\vec{p}_{(pickup)1}$ and $\vec{p}_{(dropoff)1}$. An approximation of the flow of trips between zones is computed as the product $\vec{p}_{(pickup)1}[i] \times \vec{p}_{(dropoff)1}[j]$. As shown below, the modeling and visualization of this ST data set enables a user to understand the temporal and spatial distribution of taxi demand, and extract traffic patterns from the ST data.

Figure 11:
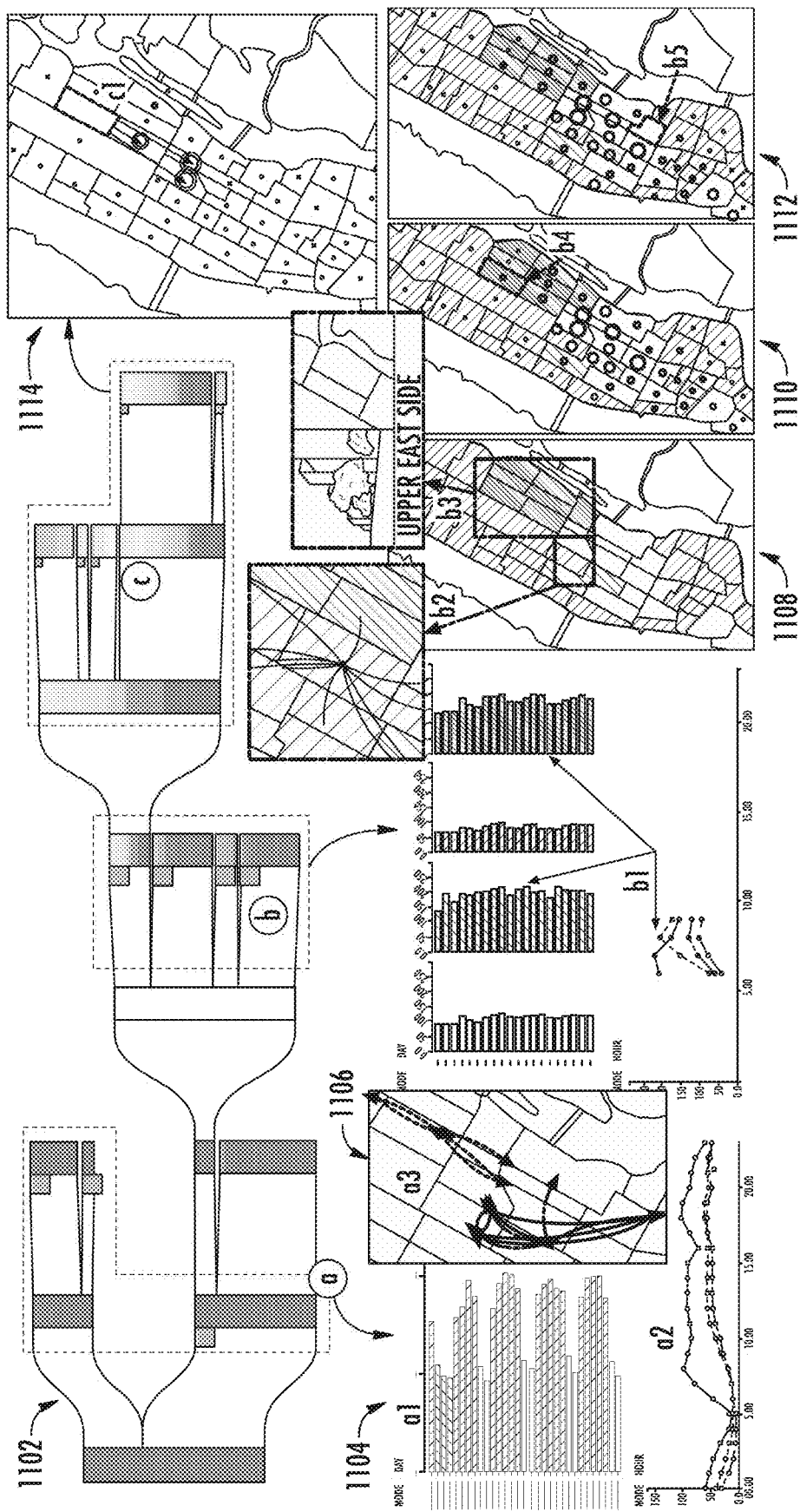
FIG. 11 is an image of another visualization resulting from experimental pattern extractions using the system of FIG. 1 and the process of FIG. 2.

FIG. 11 depicts visualization of the ST data set after several successive rounds of model generation. With 4 separate dimensions, as opposed to 3 in the previous experiments, this data set is more complex than the previous data sets. As depicted in FIG. 11, the 1-st rank loading vectors are less descriptive of the original data, whereby even after several rounds of successive partitions 11(a), 11(b), and 11(c), the data has a relatively high level of deviation (indicated by the red coloring in the node chart 1102). As shown in the bar chart 1104, the first round of partitioning 11(a) separated the data along the day dimension, and resulted in separation of the data into 3 groups corresponding to the July 4$^{th}$ weekend (orange), all other weekends (green), and all other weekdays (purple). The flow map 1106 depicts the top six flows from each group, and illustrates that the flows from the three groups span across the city.

In the second round of partitioning 11(b), the hours between 6 AM and 9 AM were manually partitioned off from the rest of the weekday hours group (purple), and the resulting sub-part was automatically partitioned into 4 groups of zones. The corresponding flow map 1108 depicts the top six flows from each of these 4 groups, which depicts a common dropoff point 11(b2). The flow map 1108 also indicates that the pink zones roughly correspond to the Upper East Side of New York City. Through similar analysis, flow maps 1110 and 1112 respectively illustrate common pickup zones 11(b4) and 11(b5) respectively. The third round of partitioning 11(c) separates the different dropoff zones for the entries originating at the pickup zone 11(b4). The corresponding flow map 1114 reveals that a majority of the trips originating at the pickup zone 11(b4) result in drop-offs in the regions 11(c1).

Experiment 4—Comparison of Flattened Piecewise Decomposition and Piecewise Successive Rank-one Tensor Decomposition Flattened Piecewise Decomposition (FPD) and Piecewise Successive Rank-one Tensor Decomposition (PSD) were examined using common data sets in order to quantitatively compare the accuracy of the models in representing the ST data. The common data sets analyzed with each modelling technique included the data set from Experiment 1 above, and a series of synthetic data sets each represented as a 100×100×100 multi-dimensional array produced with Gaussian noise designed to have optimal partitioning numbers ranging between 2 and 8 on the first mode, respectively.

Figure 12:
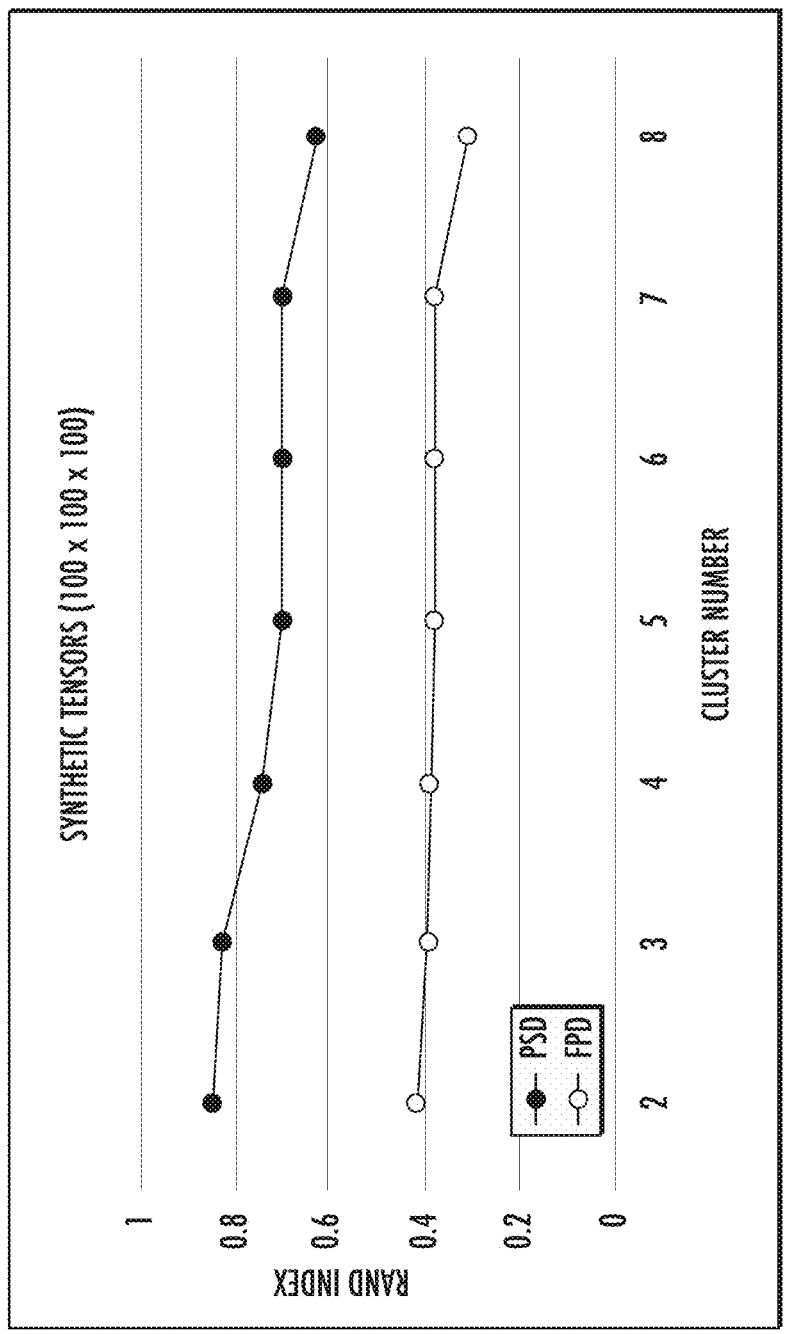
FIG. 12 is a graph comparing the cluster accuracy of two ST data analysis processes for synthetic data.

For the synthetic data sets, the decomposition cluster results were compared to the underlying data via the Adjusted Rand Index (hereinafter "ARI"), a measure for comparing data clusterings, whereby an ARI of 1 indicates an identical clustering. FIG. 12 depicts a graph with the number of clusters in a data set as the x-axis, and the ARI value as the y-axis. As shown in FIG. 12, the ARI scores for the PSD results were higher than the ARI scores for the FPD results, indicating that the PSD method is more accurate to the underlying ST data.

Figure 13:
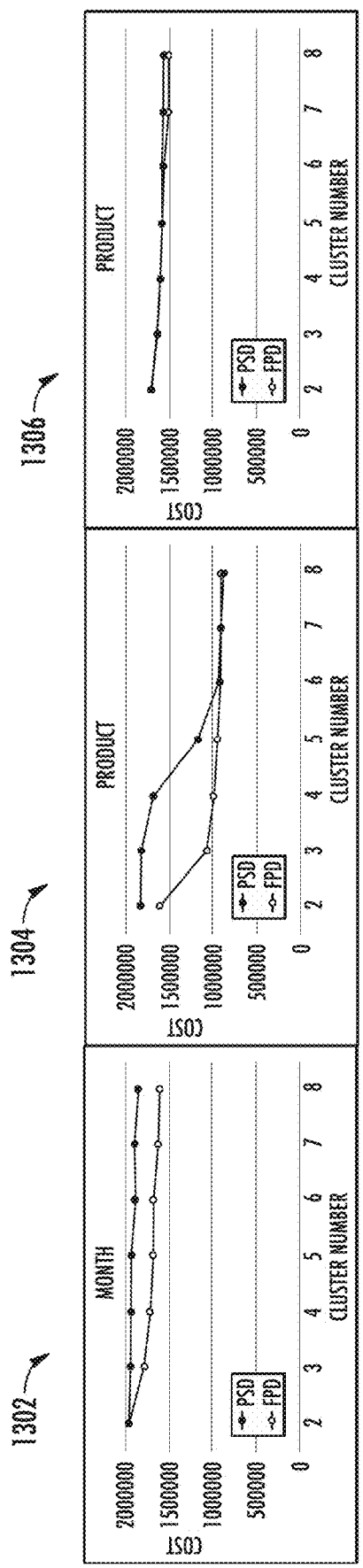
FIG. 13 is graphs comparing the cluster accuracy of two ST data analysis processes for real-world data.

For the Experimental data set, the number of partitions was manually set for each of 1 through 7 to result in samples with clusters in a range of 2-8. The cost function discussed above was used as a metric to evaluate how accurately the clusters represent the underlying ST data. FIG. 13 depicts graphs 1302 for the month mode, 1304 for the product mode, and 1306 for the state mode, with the number of clusters in a data set as the x-axis, and the sum of the cost values for the clusters as the y-axis. As depicted in the graphs 1302, 1304, and 1306, the PSD results exhibited lower costs that the FPD results in each mode, indicating that the PSD method is more accurate to the underlying ST data.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

It is claimed:

1. A method for extracting a pattern from spatio-temporal (ST) data, comprising:
   receiving, with a processor, ST data that includes a plurality of records, each record in the plurality of records including a plurality of categories of information, the plurality of categories having:
      a spatial category of information; and
      a temporal category of information;
   storing, with the processor, the ST data as a multidimensional array in a memory operatively connected with the processor, each dimension of the array corresponding to a respective one of the plurality of categories of information; and extracting at least one pattern from the stored ST data, the extracting including:

generating, with the processor, a model that approximates at least a portion of the array, wherein the generating of the model includes:

computing an approximation of the at least portion of the array via tensor decomposition; and extracting at least one loading vector of the approximation of the at least portion of the array, the at least one loading vector indicative of the at least one pattern in the ST data; and generating, with the processor and a display output device, at least one visualization of the at least one loading vector;

wherein the approximation of the at least portion of the array is computed using a piecewise tensor decomposition process that includes:

partitioning the at least portion of the array into at least two sub-arrays; and computing an approximation of each of the at least two sub-arrays via tensor decomposition; and wherein the extracting at least one loading vector of the approximation of the at least portion of the tensor includes extracting at least one respective loading vector of the approximation of each of the at least two sub-tensors.

2. The method of claim 1, wherein the piecewise tensor decomposition process is a piecewise successive rank-one tensor decomposition process, such that:

the tensor decomposition process used to compute the approximation of the at least portion of the array is a successive tensor rank decomposition process resulting in a plurality of rank-one tensor components that together define the approximation of the at least portion of the array;

the extracting at least one loading vector of the approximation of the at least portion of the array includes extracting at least one respective loading vector from each rank-one tensor component;

the piecewise tensor decomposition process further includes, for each slice of the at least portion of the array along at least one dimension:

extracting an entry corresponding to the slice from of the at least one respective loading vector from each rank-one tensor component corresponding to the at least one dimension; and combining the entries together to form a feature vector for the slice; and the partitioning of the at least portion of the array into at least two sub-arrays includes:

grouping, with the processor, the feature vectors of the slices into clusters;

determining, with the processor, partition locations for the at least portion of the array along the at least one dimension based on the clusters; and partitioning the at least portion of the array into at least two sub-arrays based on the partition locations.

3. The method of claim 1, wherein:

the computing of the approximation of at least one of the at least two sub-arrays includes:

partitioning the at least one sub-array into at least two sub-sub-arrays; and computing an approximation of each of the at least two sub-sub-arrays via tensor decomposition; and the extracting at least one loading vector of the approximation of the array includes extracting at least one respective loading vector of the approximation of each of the at least two sub-sub-arrays.

4. The method of claim 3, wherein the partitioning of the at least portion of the tensor into sub-arrays and the partitioning of the at least one sub-array into sub-sub-arrays are taken along a common dimension.

5. The method of claim 3, wherein the partitioning of the at least portion of the tensor into sub-arrays and the partitioning of the at least one sub-array into sub-sub-arrays are taken along different dimensions.

6. The method of claim 1, wherein the generating of the at least one visualization includes:

determining a discrepancy between at least portions of the approximation of the at least portion of the array and the at least portion of the array; and encoding the determined discrepancy into the at least one visualization of the at least one loading vector.

7. The method of claim 1, wherein the generating of the model is performed according to the at least one received instruction received via an input device.

8. The method of claim 1, wherein the at least one visualization includes a node chart of the ST data.

9. A system for extracting patterns from spatio-temporal (ST) data, comprising:

a display output device;

a memory configured to store:

program instructions; and

ST data represented as a multi-dimensional array, wherein:

the ST data that includes a plurality of records;

each record has a plurality of categories of information;

a first category of the information is a spatial category of information;

a second category of the information is a temporal category of information; and each dimension of the array corresponds to a respective one of the plurality of categories of information; and a processor operatively connected to the display output device and the memory, the processor being configured to execute the program instructions to extract at least one pattern from the stored ST data, wherein extracting at least one pattern from the stored ST data includes:

generating a model that approximates at least a portion of the array by:

computing an approximation of the at least portion of the array via tensor decomposition; and extracting at least one loading vector of the approximation of the at least portion of the array, the at least one loading vector indicative of the at least one pattern in the ST data; and generating at least one visualization of the at least one loading vector using the display output device;

wherein the processor is further configured to approximate of the at least portion of the array using a piecewise tensor decomposition process that includes:

partitioning the at least portion of the array into at least two sub-arrays; and computing an approximation of each of the at least two sub-arrays via tensor decomposition; and wherein the extracting at least one loading vector of the approximation of the at least portion of the array includes extracting at least one respective loading vector of the approximation of each of the at least two sub-arrays.

10. The system of claim 9, wherein the piecewise tensor decomposition process is a piecewise successive rank-one tensor decomposition process, such that:
the tensor decomposition process used to compute the approximation of the at least portion of the array is a successive tensor rank decomposition process resulting in a plurality of rank-one tensor components that together define the approximation of the at least portion of the array;
the extracting at least one loading vector of the approximation of the at least portion of the array includes extracting at least one respective loading vector from each rank-one tensor component;
the piecewise tensor decomposition process further includes, for each slice of the at least portion of the array along at least one dimension:
extracting an entry corresponding to the slice from of the at least one respective loading vector from each rank-one tensor component corresponding to the at least one dimension; and
combining the entries together to form a feature vector for the slice; and the partitioning of the at least portion of the array into at least two sub-arrays includes:
grouping, with the processor, the feature vectors of the slices into clusters;
determining, with the processor, partition locations for the at least portion of the array along the at least one dimension based on the clusters; and
partitioning the at least portion of the array into at least two sub-arrays based on the partition locations.

11. The system of claim 9, wherein:
the computing of the approximation of at least one of the at least two sub-arrays includes:
partitioning the sub-array into at least two sub-sub-arrays; and
computing an approximation of each of the at least two sub-sub-arrays via tensor decomposition; and
the extracting at least one loading vector of the approximation of the array includes extracting at least one respective loading vector of the approximation of each of the at least two sub-sub-arrays.

12. The system of claim 11, wherein the partitioning of the at least portion of the array into sub-arrays and the partitioning of the at least one sub-array into sub-sub-arrays are taken along a common dimension.

13. The system of claim 11, wherein the partitioning of the at least portion of the array into sub-arrays and the partitioning of the at least one sub-array into sub-sub-arrays are taken along different dimensions.

14. The system of claim 9, wherein the processor is further configured to:
determining a discrepancy between at least portions of the approximation of the at least portion of the array and the at least portion of the array; and
encoding the determined discrepancy into the at least one visualization of the at least one loading vector.

15. The system of claim 9, further comprising an input device, wherein:
the at least one visualization includes a graphical user interface (GUI) operatively integrated with the input device; and
the processor is further configured to:
receive at least one instruction via the input device using the GUI; and
generate the model according to the at least one received instruction.

16. The system of claim 9, wherein the at least one visualization includes a node chart of the ST data.

* * * * *